US012412996B2

(12) United States Patent
Sakr et al.

(10) Patent No.: US 12,412,996 B2
(45) Date of Patent: Sep. 9, 2025

(54) DUAL WIDEBAND ORTHOGONALLY POLARIZED ANTENNA

(71) Applicant: Analog Devices International Unlimited Company, Limerick (IE)

(72) Inventors: Ahmed A. Sakr, Cairo (EG); Mohamed Alaaeldin Moharram Hassan, Al Jizah (EG)

(73) Assignee: ANALOG DEVICES INTERNATIONAL UNLIMITED COMPANY, Limerick (IE)

( * ) Notice: Subject to any disclaimer, the term of this patent is extended or adjusted under 35 U.S.C. 154(b) by 379 days.

(21) Appl. No.: 17/670,268

(22) Filed: Feb. 11, 2022

(65) Prior Publication Data

US 2023/0261392 A1 Aug. 17, 2023

(51) Int. Cl.
*H01Q 21/06* (2006.01)
*H01Q 9/04* (2006.01)
*H01Q 21/30* (2006.01)

(52) U.S. Cl.
CPC ......... *H01Q 21/065* (2013.01); *H01Q 9/0414* (2013.01); *H01Q 21/30* (2013.01)

(58) Field of Classification Search
CPC ........................... H01Q 21/065; H01Q 9/0414
See application file for complete search history.

(56) References Cited

U.S. PATENT DOCUMENTS 8,354,972 B2 1/2013 Borja et al.
2019/0020110 A1* 1/2019 Paulotto ................ H01Q 5/392
2021/0126372 A1 4/2021 Duan et al.
2021/0351510 A1* 11/2021 Yin .......................... H01Q 1/38
2021/0367358 A1* 11/2021 He ....................... H01Q 25/001
2023/0261381 A1 8/2023 Hassen et al.

FOREIGN PATENT DOCUMENTS

CN 104319467 A * 1/2015
CN 111581848 A 8/2020
WO 2021082988 A1 5/2021

OTHER PUBLICATIONS

International Search Report and Written Opinion issued in International Patent Application No. PCT/EP2023/053306 on Apr. 18, 2023.

(Continued)

*Primary Examiner* — Dieu Hien T Duong
(74) *Attorney, Agent, or Firm* — ARENTFOX SCHIFF LLP

(57) ABSTRACT

Systems, devices, and methods related to dual wideband antennas with arbitrary frequency ranges are provided. An example antenna structure includes a high-band patch antenna to wirelessly communicate a first signal in a first frequency band; a low-band patch antenna to wirelessly communicate a second signal in a second frequency band lower than the first frequency band, wherein the low-band patch antenna is stacked vertically below the high-band patch antenna and spaced apart from the high-band patch antenna by a dielectric substrate; a high-band excitation via electrically coupled to the high-band patch antenna; and a low-band excitation via electrically coupled to the low-band patch antenna, wherein the high-band excitation via is separate from the low-band excitation via.

20 Claims, 9 Drawing Sheets

(56) References Cited

OTHER PUBLICATIONS

Haraz et al., *Four-Element Dual-Band Printed Slot Antenna Array for the Future 5G Mobile Communication Networks*, Conference Paper, DOI: 10.1109/APS.2015.7304386, Jul. 2015, 3 pages.
Elhavvash et al., *Desig of Dual-Band Dual-Polarized MINO Antenna for mm-wave 5G Base Stations with Octagonal Prism Structure*, 978-1-5386-6292-5 2019, 6 pages.
He et al., *28/39-GHz Dual-Band Dual-Polarized Millimeter Wave Stacked Patch Antenna Array for 5G Applications*, 2020 International Workshop on Antenna Technology (iWAT), 4 pages.
Stanley et al., *A Dual-Band Dual-Polarised Stacked Patch Antenna for 28 GHz and 39 GHz 5G Millimetre-Wave Communication*, $13^{th}$ European Conference on Antenna and Propagation (EuCAP 2019), 4 pages.
Chang et al., "A Novel Dual-Polarized Wideband and Miniaturized Low Profile Magneto-Electric Dipole Antenna Array for mmWave 5G Applications," Feb. 24, 2021, IEEE Open Journal of Antennas and Propagation, vol. 2, 9 pages.
Dadgarpour et al., "A Dual-Polarized Magneto-Electric Dipole Array Based on Printed Ridge Gap Waveguide with Dual-Polarized Split-Ring Resonator Lens", May 2020, IEEE Transactions on Antenna and Propagation, vol. 68, No. 5, 9 pages.
International Search Report and Written Opinion received for PCT Patant Application No. PCT/EP2023/052050, mailed on Apr. 17, 2023, 12 pages.
Lai et al., "Substrate Integrated Magneto-Electric Dipole Antenna for 5G Wi-Fi," Dec. 18, 2014, IEEE Transactions on Antennas and Propagation, vol. 63, No. 2, 5 pages.
Liu et al., "Low-Profile Broadband Magnetoelectric Dipole Antenna With Dual-Complementary Source,", Dec. 2020, IEEE Antennas and Wireless Propagation Letters, vol. 19, No. 12, 5 pages.
Neetu et al., "An Overview of Magneto-Electric Dipole Antenna Feed Design", Jun. 2015, International Journal of Advanced Engineering, Management and Science (IJAEMS), vol. 1, No. 3, 5 pages.
Yin et al., "Design of a Dual-Polarized Magnetoelectric Dipole Antenna with Gain Improvement at Low Elevation Angle for a Base Station", May 2020 IEEE Antenna and Wireless Propagation Letters, vol. 19, No. 5, 5 pages.
Zeng et al., "A Simple Wideband Magneto-Electric Dipole Antenna", Oct. 23-26, 2018, 2018 International Symposium on Antennas and Propagation (ISAP 2018), 2 pages.

* cited by examiner

DUAL WIDEBAND ORTHOGONALLY POLARIZED ANTENNA

TECHNICAL FIELD OF THE DISCLOSURE

The present disclosure generally relates to electronics, and more particularly to antennas used in radio frequency (RF) systems.

BACKGROUND

RF systems are systems that transmit and receive signals in the form of electromagnetic waves with a frequency range of approximately 3 kilohertz (kHz) to 300 gigahertz (GHz). RF systems are commonly used for wireless communications, with cellular/wireless mobile technology being a prominent example.

In the context of RF systems, an antenna is a device that serves as the interface between radio waves propagating wirelessly through space and electric currents moving in metal conductors used with a transmitter or receiver. During transmission, a radio transmitter supplies an electric current to the antenna's terminals, and the antenna radiates the energy from the current as radio waves. During reception, an antenna intercepts some of the power of a radio wave to produce an electric current at its terminals, where the electric current is subsequently applied to a receiver to be amplified. Antennas are essential components of all radio equipment, and are used in radio broadcasting, broadcast television, two-way radio, communications receivers, radar, cell phones, satellite communications and other devices.

An antenna with a single antenna element may broadcast a radiation pattern that radiates equally in all directions in a spherical wavefront. Phased array antennas may generally refer to a collection of antenna elements that are used to focus electromagnetic energy in a particular spatial direction, thereby creating a main beam. Phased array antennas may offer numerous advantages over single antenna systems, such as high gain, ability to perform directional steering, and simultaneous communication. Therefore, phased array antennas may be used more frequently in a myriad of different applications, such as in military applications, mobile technology, on airplane radar technology, automotive radars, cellular telephone and data, and Wi-Fi technology.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Overview

Figure 1A:
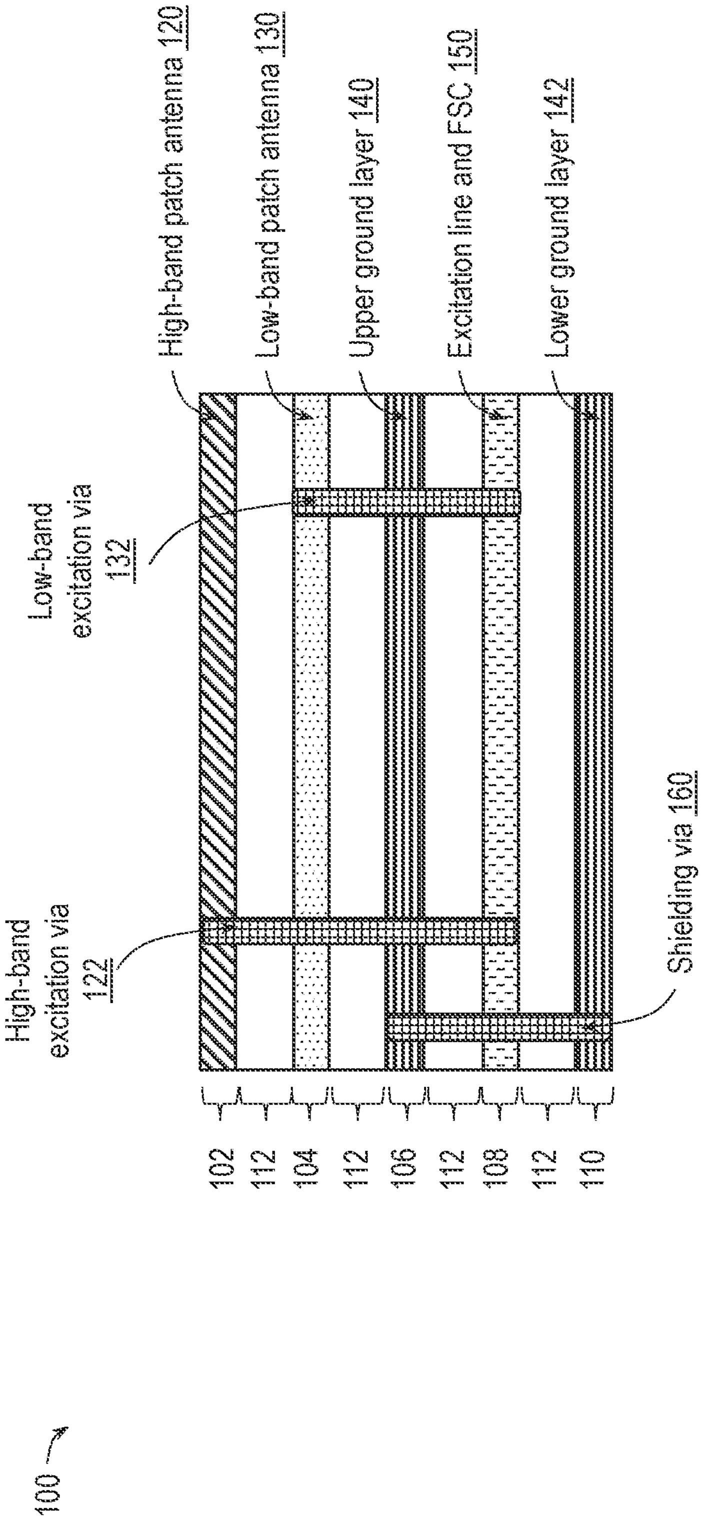
FIG. 1A illustrates an exemplary dual wideband antenna structure, according to some embodiments of the disclosure.

The systems, methods and devices of this disclosure each have several innovative embodiments, no single one of which is solely responsible for all of the desirable attributes disclosed herein. Details of one or more implementations of the subject matter described in this specification are set forth in the description below and the accompanying drawings.

As described above, antennas can be used in an RF system to transmit and/or receive radio waves wirelessly through space. As the demand for wireless communication continues to grow, there is an interest in developing wireless communications over millimeter wave bands due to the large bandwidths available at these high frequencies. For instance, fifth generation (5G) systems and networks may utilize 28 GHz and 39 GHz millimeter spectrum bands to provide services with higher data rates and/or lower latencies than services provided in lower frequency bands. As such, there is a need to design dual band antennas, for example, to operate over 28 GHz and 39 GHz bands. An antenna is typically designed to radiate at a certain resonant frequency. Dual band operations can easily be achieved at multiples of the antenna resonant frequency. However, when two bands are relatively close to each other in frequency, for example, at about 28 GHz and about 39 GHz as mentioned, it may be challenging to achieve dual band operations, and particularly having wide bandwidths for both frequency bands. For instance, it may be desirable for a 28/39 GHz dual band antenna to provide a bandwidth of about 5.5 GHz to about 6.5 GHz for each of the 28 GHz band and the 39 GHz bands. In general, a dual wideband antenna may refer to an antenna that can provide a fractional bandwidth of about 8% or more for each of the dual bands.

In some examples, a dual band antenna may be formed from a single patch antenna. However, dual bands provided by a signal patch antenna may typically have a wide bandwidth for only one of the bands. For example, a single patch antenna may provide a bandwidth of about 1.6 GHz for a 28 GHz band and a bandwidth of about 3.5 GHz for a 39 GHz band). While a more complex structure or design (e.g., an electromagnetic band gap (EBG) structure) can be incorporated into a single patch antenna to enhance the bandwidths for the dual bands, it may still be difficult to achieve a wide bandwidth for each of the dual bands. Furthermore, the complex EBG structure can increase the size and/or cost of the antenna, and thus may be undesirable. In other examples, a dual band antenna may be formed from two stacked patch antennas, for example, including one patch antenna operative at a high frequency band and another patch antenna operative at a low frequency band. However, these stacked patch antennas may typically operate based on capacitively couplings between the two patch antennas. As such, the design of the stacked patch antennas is tightly coupled to the specific frequency ranges of the dual bands, and thus may not be easily scaled to any arbitrary frequency ranges. Further, because of the capacitive coupling between the two patch antennas, it may also be difficult to achieve a wide bandwidth for each of the dual bands.

The present disclosure describes mechanisms for providing dual wideband orthogonally polarized antennas operative at arbitrary frequency bands. The disclosed antenna structures or elements are based on two independent stacked patch antennas, each radiates independently at a separate frequency band at any arbitrary frequency ranges with an appropriate bandwidth. In one aspect of the present disclosure, a dual wideband antenna structure may include a high-band patch antenna and a low-band patch antenna stacked below the high-band patch antenna and spaced apart from the high-band patch antenna by a dielectric material or substrate. The high-band patch antenna may be a first patch antenna having a first resonant frequency within a first frequency band, and the low-band patch antenna may be a second, separate patch antenna having a second resonant frequency within a second frequency band lower in frequency than the first frequency band. The low-band patch antenna may have a larger size than the high-band patch antenna to operate in the lower frequency band. The high-band patch antenna and the low-band patch antenna may radiate independent of each other. To that end, the antenna structure may further include a high-band excitation via (e.g., a first excitation conductor) electrically coupled to the high-band patch antenna and a separate low-band excitation via (e.g., a second excitation conductor) electrically coupled to the low-band patch antenna. In some aspects, the antenna structure may include a multi-layered structure (e.g., a multi-layered printed circuit board (PCB) structure including multiple conductive layers separated by a dielectric material), where the high-band patch antenna may be disposed on a first layer of the structure, the low-band patch antenna may be disposed on a second layer of the structure vertically below the first layer, and the high-band excitation via and the low-band excitation via may extend vertically from a third layer of the structure vertically below the second layer. The third layer may include one or more excitation striplines where signals are fed to and/or from the high-band patch antenna and the low-band patch antenna. The third layer can be between an upper ground layer and a lower ground layer of the structure, where the upper ground layer and the lower ground layer are vertically below the second layer.

In one aspect, the antenna structure may include a single excitation or feeding port for both the high-band patch antenna and the low-band patch antenna. In this regard, the antenna structure may include a single excitation stripline or stripline feed (e.g., a third excitation conductor) disposed on the third layer. For the high-band patch antenna and the low-band patch antenna to operate independent of each other, the antenna structure may further include a frequency selective coupling (FSC) element. The FSC element may be a coupler or filter that couples signals at a specific frequency range while reflecting signals at any other frequency ranges. For instance, the FSC element may couple (or pass) high-frequency signals (in the first frequency band) but may reflect low-frequency signals (in the second frequency band). Accordingly, the low-band patch antenna may be electrically coupled to the excitation stripline directly while the high-band patch antenna may be electrically coupled to the excitation stripline indirectly through the FSC element.

In another aspect, the antenna structure may include separate feeding ports (dual excitation ports) for the high-band patch antenna and low-band patch antenna. In this regard, the antenna structure may include a first excitation stripline (e.g., a third excitation conductor) and a second, separate excitation stripline (e.g., a fourth excitation conductor) disposed on the third layer of the structure. The first excitation stripline may be electrically coupled to the high-band excitation via (which is connected and in contact with the high-band patch antenna), and the second excitation stripline may be electrically coupled to the low-band excitation via (which is connected and in contact with the low-band patch antenna).

In some aspects, the high-band patch antenna may be associated with a first polarization, and the low-band patch antenna may be associated with a second polarization different from the first polarization. For instance, the high-band patch antenna may radiate radio waves with one of a horizontal polarization or a vertical polarization, and the low-band patch antenna may radiate radio waves with the other one of the horizontal polarization or the vertical polarization. In this way, the high-band patch antenna and the low-band patch antenna can simultaneously communicate in respective first and second frequency bands without impacting each other's performance.

In some aspects, at least one of the high-band patch antenna or the low-band patch antenna may include a resonant slot or opening (e.g., a U-shaped opening) to enhance (or widen) a corresponding operational bandwidth.

In a further aspect of the present disclosure, a dual band antenna array apparatus may include a plurality of dual band antenna elements, each including two independent stacked patch antennas with a single stripline excitation or dual stripline excitations as discussed herein. The antenna array apparatus may further include beamformer circuitry coupled to the plurality of dual band antenna elements. The beamformer circuitry may include a plurality of beamformer channels. For the antenna configuration with dual stripline excitations, a first subset of the plurality of beamformer channels may be associated with the first frequency band (e.g., a high frequency band), and a second, different, subset of the plurality of beamformer channels may be associated with the second frequency band (e.g., a low frequency band). In one aspect, the beamformer circuitry may include two separate beamformer integrated circuit (BFICs), a first BFIC and a second, separate BFIC. The first BFIC may include the first subset of the beamformer channels for beamforming signals in the first, higher frequency band. The second BFIC may include the second subset of the beamformer channels for beamforming signals in the second, lower frequency band. In another aspect, the beamformer circuitry may be a single BFIC, where the first subset of the plurality of beamformer channels associated with the high frequency band can be arranged in an interleaving manner. For instance, the first subset of the plurality of beamformer channels may be spaced apart (physically) from each other by the second subset of the plurality of beamformer channels in the BFIC. For the antenna configuration with a single stripline excitation, the beamformer circuitry may be a single BFIC and the beamformer channels may be dual band beamformer channels.

The systems, schemes, and mechanisms described herein advantageously provide techniques (e.g., a systematic approach) for designing dual band antennas that can radiate or operate in arbitrary frequency ranges. Accordingly, dual band antennas using the disclosed structure can be easily configured to support dual band operations at any frequency ranges with appropriate bandwidths. Further, utilizing dual band antennas can allow a dual band system to utilize a single antenna or antenna array for both frequency bands rather than two separate antennas or antenna arrays, and thus can save system cost, system footprint, and/or simplify design.

Example Dual Wideband Antennas with a Single Stripline Excitation

FIGS. 1A-1E are discussed in relation to each other to illustrate an exemplary dual wideband antenna structure 100. The antenna structure 100 may be suitable for use in an RF system for wireless transmission and/or reception. The antenna structure 100 may be suitable for use with beamformers to provide beam steering (e.g., as shown in FIGS. 3-6).

FIG. 1A illustrates a sectional view of the exemplary dual wideband antenna structure 100, according to some embodiments of the disclosure. The sectional view may be taken along the line 105 of FIG. 1B and shows a vertical arrangement of the antenna structure 100. At a high level, the antenna structure may include two independent patch antennas (e.g., a high-band patch antenna 120 and a separate low-band patch antenna 130) arranged on top of each other in a multi-layered structure (e.g., a multi-layered printed circuit board (PCB) stack-up) with a single excitation. The single excitation may refer to the feeding port that interfaces external signals into and/or out of the antenna structure 100, for example, from a beamformer in the case of transmission or to a beamformer in the case of reception, respectively. The multi-layered structure may include a plurality of conductive layers (e.g., shown 102, 104, 106, 108, and 110) spaced apart by insulating layers 112. The conductive layers may be made of copper or any suitable conductive material. The insulating layers 112 may be made of dielectric material or any suitable insulating material. The conductive layers may be configured to operate as signal layers or ground layers. In the illustrated example of FIG. 1A, the antenna structure 100 may have three signal layers (e.g., a first layer 102, a second layer 104, and a third layer 108) and two ground layers (e.g., an upper ground layer 140 and a lower ground layer 142).

As shown in FIG. 1A, the high-band patch antenna 120 is disposed on the first layer 102 (e.g., a top layer or an outer layer) of the antenna structure 100 and, the low-band patch antenna 130 is disposed on the second layer 104 of the antenna structure 100. The second layer 104 is vertically below the first layer 102. The high-band patch antenna 120 may be a radiating planar element with a first resonant frequency within a first frequency band. The low-band patch antenna 130 may be a radiating planar element with a second resonant frequency within a second frequency band lower in frequency than the first frequency band. Phrased differently, the high-band patch antenna 120 may be excitable by high-frequency signals with a frequency range within the first frequency band, and the low-band patch antenna 130 may be excitable by low-frequency signals with a frequency range within the second frequency band. In some instances, the first resonant frequency of the high-band patch antenna 120 are non-integer multiples of the second resonant frequency of the low-band patch antenna 130 (e.g., with a ratio greater than 1 and less than 2). In some specific examples, the first frequency band may be at about 39 GHz, the second frequency band may be at about 28 GHz band, and the high-band patch antenna 120 and the low-band patch antenna 130 may each have a bandwidth of about 5.5 GHz to about 6.5 GHz. To operate in the lower second frequency band, the low-band patch antenna 130 may have a larger size (e.g., a longer length or a large radiating surface area) than the high-band patch antenna 120.

In some aspects, the low-band patch antenna 130 may be arranged such that the low-band patch antenna 130 is vertically below the high-band patch antenna 120 and at least partially overlaps with the high-band patch antenna 120. A patch antenna is formed from a planar sheet (or "patch") of metal arranged above a ground plane. Because the high-band patch antenna 120 and the low-band patch antenna 130 operate independent from each other as will be discussed more fully below, the low-band patch antenna 130 can operate as a ground layer to the high-band patch antenna 120. Further, in some instances, it may be advantageous to arrange the smaller-sized high-band patch antenna 120 on the top layer or outer layer of the antenna structure 100 and the larger-sized low-band patch antenna 130 below the high-band patch antenna 120 so that the high-band radiating mode and the low-band radiating mode can co-exist in the antenna structure 100.

To interface external signals into and/or out of the high-band patch antenna 120 and/or the low-band patch antenna 130, the antenna structure 100 may further include an excitation stripline and a FSC element 150 disposed on the third layer 108 of the antenna structure 100, where the third layer 108 may be between the upper ground layer 140 (e.g., the layer 106) and the lower ground layer 142 (e.g., the layer 110). The excitation stripline and the FSC element 150 are shown separately as an excitation stripline 152 and a FSC element 154 in FIG. 1B. The excitation or feeding mechanisms are discussed more fully below.

As further shown in FIG. 1A, the antenna structure 100 includes a high-band excitation via 122 (e.g., a vertical electrical conductor) extending vertically from the third layer 108, through the second layer 104, to the first layer 102. More specifically, the high-band excitation via 122 may have one end electrically coupled (e.g., a direct connection) to the high-band patch antenna 120 and another end electrically coupled to the excitation stripline and FSC element 150. The high-band excitation via 122 may extend through the upper ground layer 140 and the low-band patch antenna 130 without contacting the upper ground layer 140 and the low-band patch antenna 130. For instance, the upper ground layer 140 and the second layer 104 may include respective openings or through holes at which the high-band excitation via 122 passes through the upper ground layer 140 and the second layer 104. In a similar way, the antenna structure 100 includes a low-band excitation via 132 (e.g., a vertical electrical conductor) extending vertically from the third layer 108 to the second 104. More specifically, the low-band excitation via 132 may have one end electrically coupled (e.g., a direct connection) to the low-band patch antenna 130 and another end electrically coupled to the excitation stripline and FSC element 150. The low-band excitation via 132 may extend through the upper ground layer 140 without contacting the upper ground layer 140. For instance, the upper ground layer 140 may include an opening or a through hole at which the low-band excitation via 132 passes through the upper ground layer 140.

As can be seen in FIG. 1A, the high-band excitation via 122 and the low-band excitation via 132 are individual vias separate from each other. That is, the high-band patch antenna 120 and the low-band patch antenna 130 are independently fed through a respective direct electrical connection. Thus, the high-band excitation via 122 and the low-band excitation via 132 are independent feeding points. In operation, the high-band excitation via 122 may propagate a high-frequency signal in the first frequency band (e.g., at about 39 GHz) to the high-band patch antenna 120 for transmission (e.g., in the form of electromagnetic waves in a free space). For reception, the high-band excitation via 122 may propagate a high-frequency signal in the first frequency band received by the high-band patch antenna 120. In a similar way, the low-band excitation via 132 may propagate a low-frequency signal in the second frequency band (e.g., at about 28 GHz) to the low-band patch antenna 130 for transmission (e.g., in the form of electromagnetic waves in a free space). For reception, the low-band excitation via 132 may propagate a low-frequency signal in the second frequency band received by the low-band patch antenna 130.

As further shown in FIG. 1A, the antenna structure 100 may include a shielding via 160 extending between the lower ground layer 142 and the upper ground layer 140. The shielding via 160 is a vertical connection in the antenna structure 100. In general, the antenna structure 100 may include any suitable number of shielding vias (e.g., 2, 3, 4, 5 or more) placed in any suitable locations. Shielding vias may generally be placed along a route or via that carries an RF signal to reduce crosstalk and electromagnetic interference to the route. For instance, the shielding via 160 may be placed to reduce interference for a signal propagating along the high-band excitation via 122.

While FIG. 1A illustrates the antenna structure 100 having five conductive layers (e.g., 102, 104, 106, 108, and 110), in other instances, the antenna structure 100 can include any suitable number of conductive layers (e.g., about 6, 7, 8, 9, 10, 11, 12 or more).

Figure 1B:
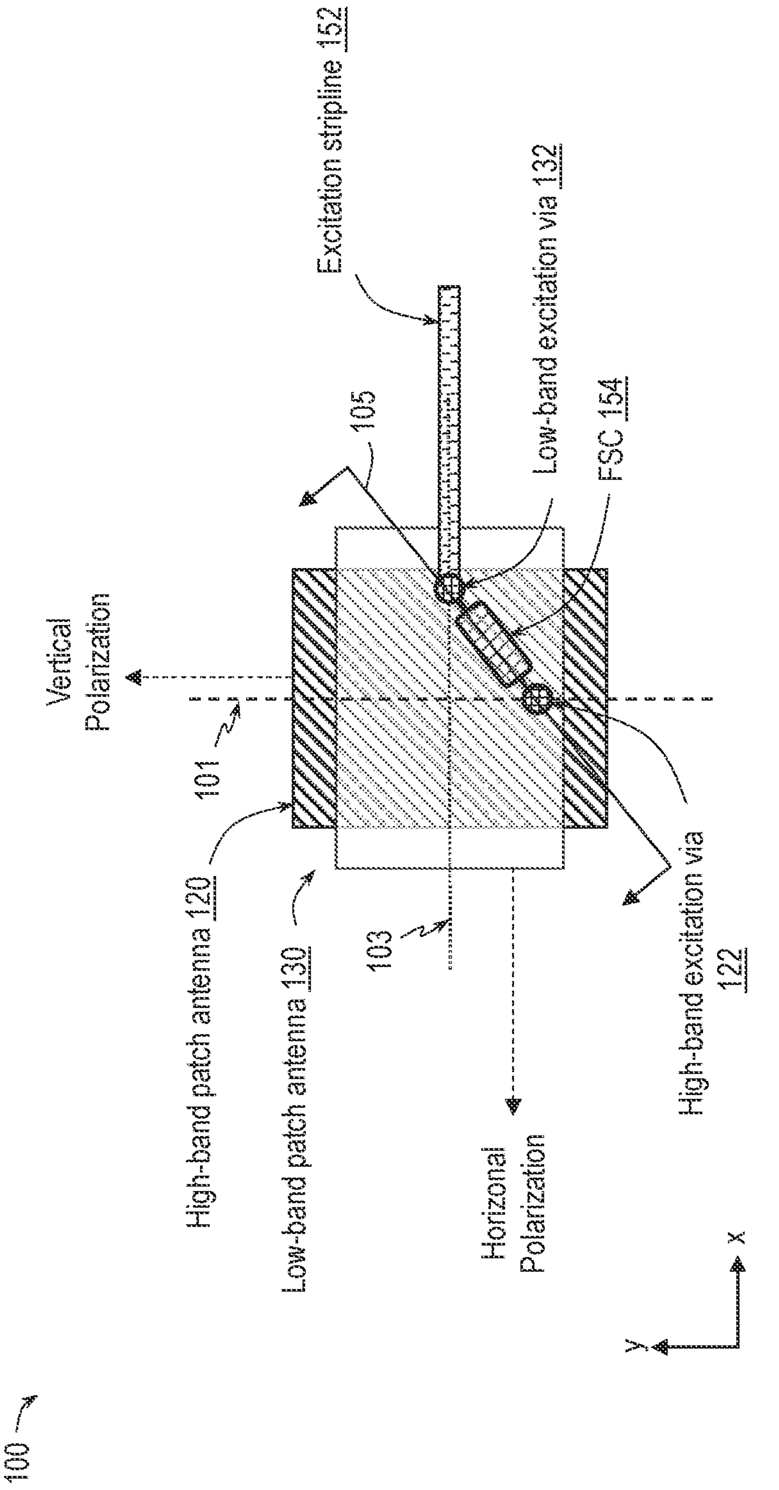
FIG. 1B is a bottom view of an exemplary dual wideband antenna structure, according to some embodiments of the disclosure.

FIG. 1B is a bottom view of the exemplary dual wideband antenna structure 100, according to some embodiments of the disclosure. The bottom view is from the bottom of the third layer 108 of the antenna structure 100. In order not to clutter the drawings provided in FIG. 1B, the insulating layers 112 are not shown in FIG. 1B.

As shown in FIG. 1B, each of the high-band patch antenna 120 and the low-band patch antenna 130 are planar rectangular shaped patch of conductive material. The high-band patch antenna 120 and the low-band patch antenna 130 can be arranged such that the long side of the high-band patch antenna 120 is about perpendicular to the long side of the low-band patch antenna 130. That is, the high-band patch antenna 120 may be rotated by about 90 degrees compared to the low-band patch antenna 130. As such, the high-band patch antenna 120 and the low-band patch antenna 130 may radiate with orthogonal polarizations. In the illustrated example of FIG. 1A, the high-band patch antenna 120 may radiate with a vertical polarization, and the low-band patch antenna 130 may radiate with a horizontal polarization. Because of the orthogonal polarizations used by the high-band patch antenna 120 and the low-band patch antenna 130, the high-band patch antenna 120 and the low-band patch antenna 130 may simultaneously communicate in respective frequency bands without interfering with each other. Furthermore, because of the symmetric structure of the high-band patch antenna 120 with respect to the high-band excitation via 122, the high-band patch antenna 120 may have a short circuit line (e.g., a virtual short circuit line) as shown by the dotted line 103. By placing the low-band excitation via 132 along the short circuit line 103 of the high-band patch antenna 120, any excitation at the low-band excitation via 132 may not affect the performance of the high-band patch antenna 120. Similarly, because of the symmetric structure of the low-band patch antenna 130 with respect to the low-band excitation via 132, the low-band patch antenna 130 may have a short circuit line (e.g., a virtual short circuit line) as shown by the dashed line 101. By placing the high-band excitation via 122 along the short circuit line 101 of the low-band patch antenna 130, any excitation at the high-band excitation via 132 may not affect the performance of the low-band patch antenna 130. That is, the placement of the high-band excitation via 122 and the low-band excitation via 132 can further decouple operations of the high-band patch antenna 120 and the low-band patch antenna 130.

While FIG. 1B illustrates an arrangement for the high-band patch antenna 120 to radiate with a vertical polarization, and the low-band excitation via 130 to radiate with a horizontal polarization, in other examples, the high-band patch antenna 120 and the low-band patch antenna 130 may be arranged (with orientations of the high-band patch antenna 120 and the low-band patch antenna 130 swapped) such that the high-band patch antenna 120 may radiate with a horizontal polarization and the low-band patch antenna 130 may radiate with a vertical polarization instead. Further, while FIG. 1B illustrates the high-band patch antenna 120 and the low-band patch antenna 130 as rectangular shaped planar patches, in other examples, the high-band patch antenna 120 and the low-band patch antenna 130 can have other shapes (e.g., triangle, circle, lines, and/or any geometrical shape).

As mentioned above, the antenna structure 100 may include an excitation stripline and FSC 150 disposed on the third layer 108 of the structure. FIG. 1B illustrates the excitation stripline and FSC element 150 separately as an excitation stripline 152 and a FSC element 154 (shown as FSC). The excitation stripline 152 is a transmission line structure configured to feed signals (e.g., from a beamformer) into the antenna structure 100 for transmission (by the high-band patch antenna 120 and/or the low-band patch antenna 130) and/or feed signals received from the antenna structure 100 (by the high-band patch antenna 120 and/or the low-band patch antenna 130) to a downstream component (e.g., a beamformer). In some instances, the excitation stripline 152 may be a horizontal conducting line arranged on the third layer 108 with one end near an edge of the antenna structure 100 and extending inwards towards the high-band patch antenna 120 and/or the low-band patch antenna 130. The FSC element 154 may be a coupler or filter that couples signals at a specific frequency range while reflecting signals at any other frequency ranges. In the illustrated example of FIG. 1B, the FSC element 154 may couple (or pass) a high-frequency portion of a signal through but may reflect a low-frequency portion of the signal. For instance, the FSC element 154 may be configured to pass a signal in the 39 GHz band through but not a 28 GHz signal. Because the antenna structure 100 utilizes a single excitation to interface signals into and/or out of the antenna structure 100, the FSC element 154 is used to direct high-frequency signals to the high-band excitation via 122 and isolate low-frequency signals from the high-band excitation via 122.

As further shown in FIG. 1B the excitation stripline 152 is connected directly to the low-band excitation via 132, and indirectly to the high-band excitation via 122 through the FSC element 154. That is, the FSC element 154 may have one port or terminal coupled to the excitation stripline 152 and another port or terminal coupled to the high-band excitation via 122.

Referring to the same example with the high-band patch antenna 120 being operative in a 39 GHz band and the low-band patch antenna 130 being operative in a 28 GHz band, when the excitation stripline 152 is excited by a 28 GHz signal (a low-frequency signal), no signal passes through the FSC element 154. Thus, the entire signal may be propagated to the low-band excitation via 132 which then passes the signal to the low-band patch antenna 130 for transmission. The high-band patch antenna 120 is not excited in this case. Further, as mentioned above, because the high-band excitation via 122 is located at or aligned to the short circuit line 101 of the low-band patch antenna 130, the high-band excitation via 122 may not affect the performance of the low-band patch antenna 130. The low-band patch antenna 130 may radiate the 28 GHz signal with a vertical polarization.

On the other hand, when the excitation stripline 152 is excited by a 39 GHz signal (a high-frequency signal), the entire signal may be propagated to the low-band excitation via 132 and through the FSC element 154 to the high-band excitation via 122. The low-band patch antenna 130 is not excited in this case. Further, because the low-band excitation via 132 is located at or aligned to the short circuit line 103 of the high-band patch antenna 120, the low-band excitation via 132 may not affect the performance high-band patch antenna 120. The high-band patch antenna 120 may radiate the 39 GHz signal with a horizontal polarization. Receptions by the high-band patch antenna 120 and/or the low-band patch antenna 130 may operate in a substantially similar way but in a reverse direction.

Figure 1C:
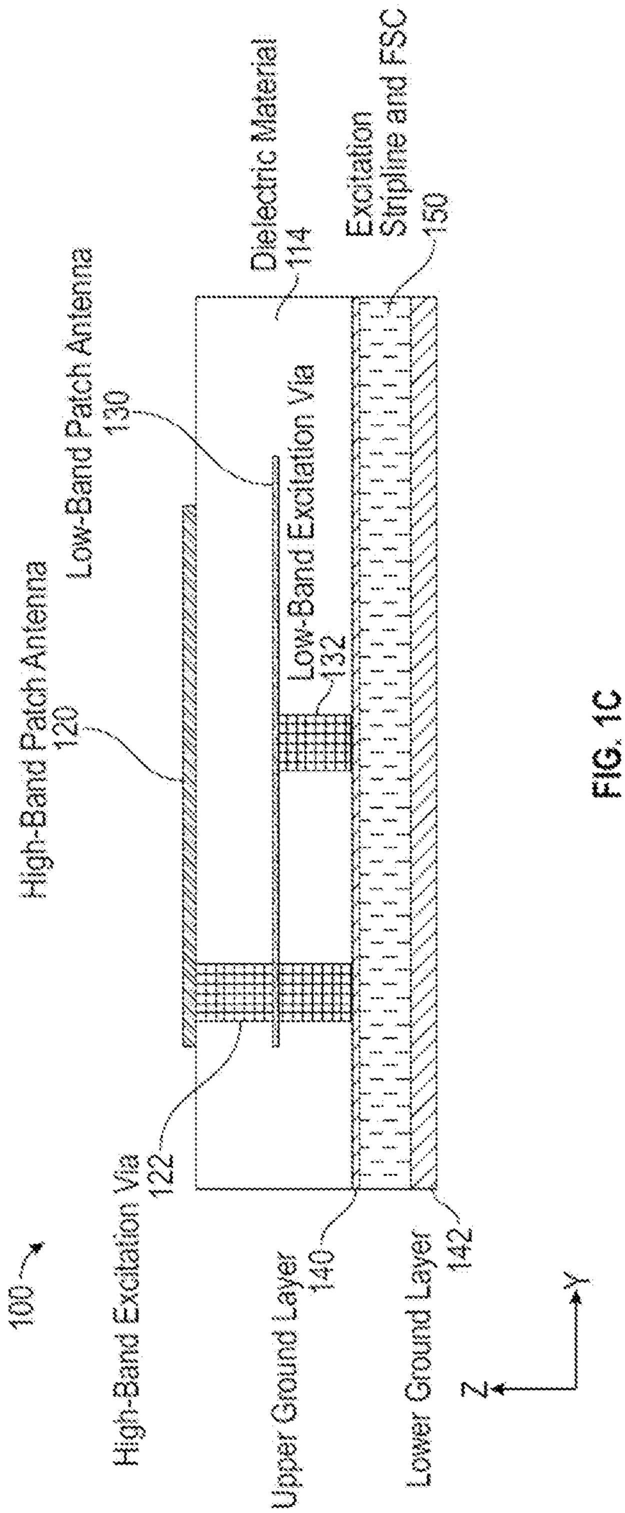
FIG. 1C is a sideview of an exemplary dual wideband antenna structure, according to some embodiments of the disclosure.

FIG. 1C is a sectional view of the exemplary dual wideband antenna structure 100, according to some embodiments of the disclosure. The sectional may be taken along the line 105 of FIG. 1B. As shown in FIG. 1C, the low-band patch antenna 130 is stacked vertically below the high-band patch antenna 120 and spaced apart from the high-band patch antenna 120 by a dielectric substrate 114 (e.g., corresponding to the insulating layers 112). The low-band excitation via 132 is directly coupled (and in direct contact with) to the low-band patch antenna 130. The high-band excitation via 122 is directly coupled to (and in direct contact with) the high-band patch antenna 120. The high-band excitation via 122 may pass through the low-band patch antenna 130 but without contacting the low-band patch antenna 130. A more detailed view of the arrangement of the high-band excitation via 122 in the antenna structure 100 is shown in FIGS. 1D and 1E.

Figure 1D:
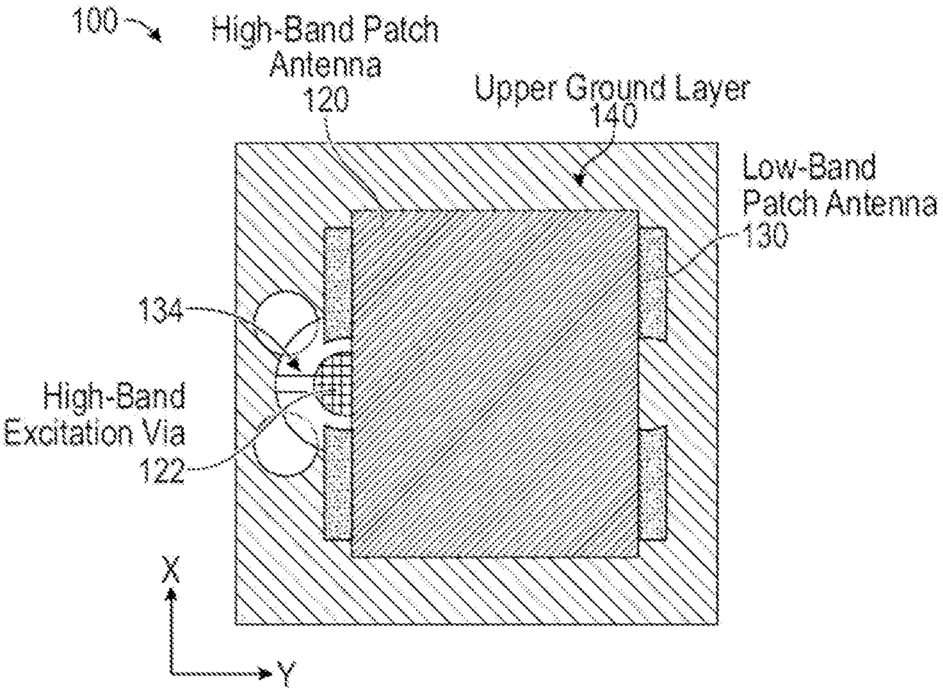
FIG. 1D is a top view of an exemplary dual wideband antenna structure, according to some embodiments of the disclosure.

FIG. 1D is a top view of the exemplary dual wideband antenna structure 100, according to some embodiments of the disclosure. FIG. 1D shows the high-band patch antenna 120 being on top of the low-band patch antenna 130, and the low-band patch antenna 130 being on top of the upper ground layer 140. In order not to clutter the drawings provided in FIG. 1D, the insulating layers 112 are not shown in FIG. 1D. As shown in FIG. 1D, the high-band excitation via 122 may pass through the low-band patch antenna 130 to connect to the high-band patch antenna 120 without being in contact with the low-band patch antenna 130. The low-band patch antenna 130 may include an opening or a clearance 134 at which the high-band excitation via 122 passes through so that the high-band excitation via 122 may not be in contact with the low-band patch antenna 130. Stated differently, the low-band patch antenna 130 may have a discontinuity of conductive material to provide the clearance 134 for the high-band excitation via 122 to pass through.

Figure 1E:
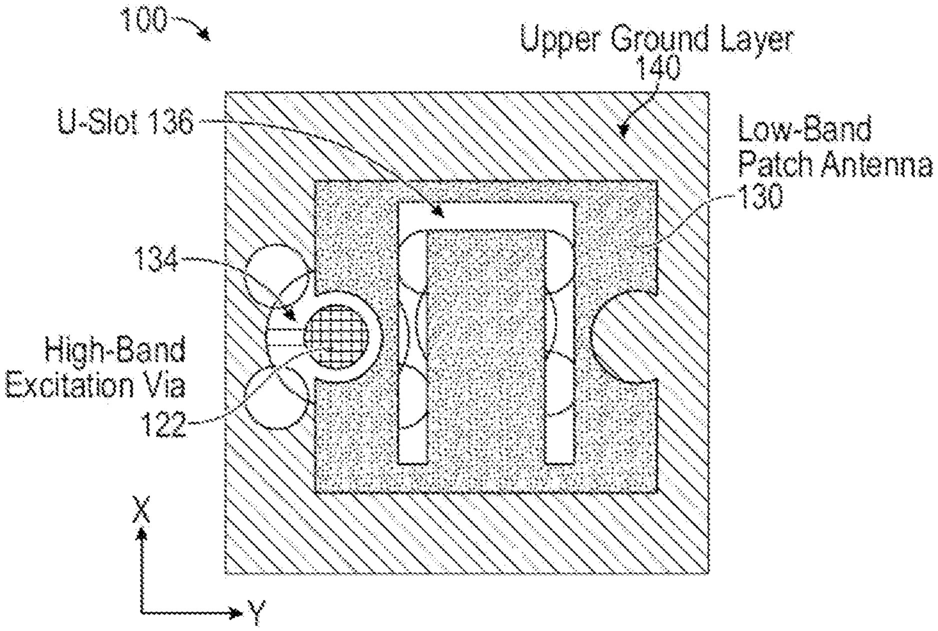
FIG. 1E is a top view of an exemplary dual wideband antenna structure, according to some embodiments of the disclosure.

FIG. 1E is a top view of an exemplary dual wideband antenna structure, according to some embodiments of the disclosure. In order not to clutter the drawings provided in FIG. 1E, the insulating layers 112 are not shown in FIG. 1E. The top view shown in FIG. 1E is substantially the same as in FIG. 1D but without the high-band patch antenna 120 (e.g., the high-band patch antenna 120 and the excitation connection pin for the high-band patch antenna 120 disconnected). As can be seen in FIG. 1E, the low-band patch antenna 130 includes the clearance 134 at which the high-band excitation via 122 passes through. As further shown in FIG. 1E, the low-band patch antenna 130 may have a U-shaped resonant slot or U-slot 136 (e.g., an opening at about a center of the low-band patch antenna 130). The inclusion of the U-slot 136 can enhance (e.g., widen) the operational bandwidth of the low-band patch antenna 130. In general, the high-band patch antenna 120 and/or the low-band patch antenna 130 can incorporate a resonant slot to increase a corresponding operational or radiation bandwidth. In some aspects, the high-band patch antenna 120 may have a fractional bandwidth of about 14%, and the low-band patch antenna 130 may have a fractional bandwidth of about 23%.

While the antenna structure 100 is discussed with the example of the high-band patch antenna 120 operative at a 39 GHz band and the low-band patch antenna 130 operative at a 28 GHz band, the antenna structure 100 can be configured to operate in any frequency ranges. For example, by feeding the high-band patch antenna 120 and the low-band patch antenna 130 separately through direct connections by the high-band excitation via 122 and the low-band excitation via 132, respectively, rather than through parasitic or capacitive coupling between the patches, the antenna structure 100 can be used to provide dual band operations with arbitrary frequency ranges. Further, by incorporating resonant slots, the antenna structure 100 can provide dual wideband operations. Further still, while the antenna structure 100 is illustrated with a FSC element 154 with a high-pass filter, aspects are not limited thereto. For instance, the antenna structure 100 can utilize a FSC element with a low-pass filtering property and the single stripline can be coupled to the high-band excitation via 122 instead of the low-band excitation via 132 as shown in FIG. 1B.

Example Dual Wideband Antennas with Dual Stripline Excitations

Figure 2:
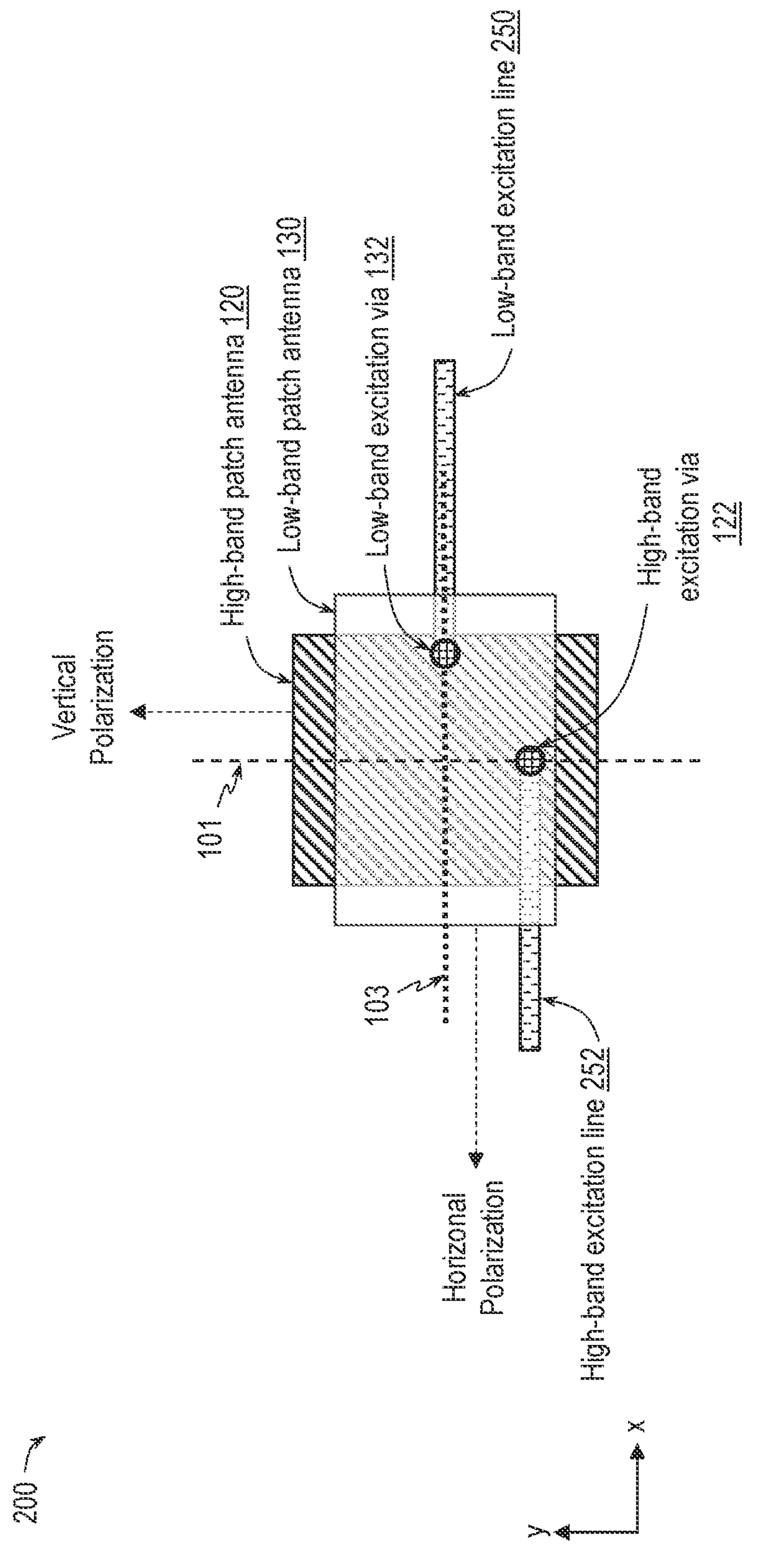
FIG. 2 is a bottom view of an exemplary dual wideband antenna structure, according to some embodiments of the disclosure.

FIG. 2 is a bottom view of an exemplary dual wideband antenna structure 200, according to some embodiments of the disclosure. The antenna structure 200 may be suitable for use in an RF system for wireless transmission and/or reception. The antenna structure 200 may be suitable for use with beamformers to provide beam steering (e.g., as shown in FIGS. 3-6). The antenna structure 200 may be substantially similar to the antenna structure 100 of FIGS. 1A-1E. For instance, the antenna structure 200 may include two independent stacked patch antennas (e.g., a high-band patch antenna 120 and a low-band patch antenna 130) arranged on a multi-layered structure (e.g., a multi-layer PCB stack-up) where the high-band patch antenna 120 may be disposed on a first layer (e.g., the layer 102) and the low-band patch antenna 130 may be disposed on a second layer (e.g., the layer 104) as discussed above with reference to FIGS. 1A-1E. However, the antenna structure 200 may utilize dual stripline excitations instead of a signal stripline excitation. As shown, the antenna structure 200 of FIG. 2 shares many elements with the antenna structure 100 of FIG. 1B; for brevity, a discussion of these elements is not repeated, and these elements may take the form of any of the embodiments disclosed herein.

Similar to FIG. 1B, FIG. 2 shows a bottom view from the bottom of a third layer (e.g., the layer 108) of the antenna structure 200. In order not to clutter the drawings provided in FIG. 2, the insulating layers 112 are not shown in FIG. 2. As shown in FIG. 2, the antenna structure 200 may include a high-band excitation stripline 252 and a separate low-band excitation stripline 250. The high-band excitation stripline 252 may be electrically coupled to the high-band excitation via 122. That is, the high-band excitation via 122 may have one end electrically coupled (e.g., a direction connection) to the high-band patch antenna 120 and another end electrically coupled (e.g., a direction connection) to the high-band excitation stripline 252. In a similar way, the low-band excitation stripline 250 may be electrically coupled to the low-band excitation via 132. That is, the low-band excitation via 132 may have one end electrically coupled (e.g., a direction connection) to the low-band patch antenna 130 and another end electrically coupled (e.g., a direction connection) to the low-band excitation stripline 250. Each of the excitation striplines 250 and 252 may independently feed signals into and/or out of the antenna structure 200 in a respective frequency band, and each of the low-band patch antenna 130 and the high-band patch antenna 120 may radiate independently in a respective frequency band. In some instances, it may be advantageous to place the high-band excitation stripline 252 and the low-band excitation stripline 250 on opposite sides of the antenna structure 200, for example, to reduce crosstalk.

Referring to the same example with the high-band patch antenna 120 being operative in a 39 GHz band and the low-band patch antenna 130 being operative in a 28 GHz band, when the low-band excitation stripline 250 is excited by a 28 GHz signal (a low-frequency signal), the signal may propagate to the low-band excitation via 132 and then further to the low-band patch antenna 130, and the low-band patch antenna 130 may radiate the 28 GHz signal with a horizontal excitation.

Similarly, when the high-band excitation stripline 252 is excited by a 39 GHz signal (a high-frequency signal), the signal may propagate to the high-band excitation via 122 and then further to the high-band patch antenna 120, and the high-band patch antenna 120 may radiate the 39 GHz signal with a vertical excitation Receptions by the high-band patch antenna 120 and/or the low-band patch antenna 130 may operate in a substantially similar way but in a reverse direction. As similarly explained above, because the high-band excitation via 122 is located at or aligned to the short circuit line 101 of the low-band patch antenna 130, excitations at the high-band excitation via 122 may not affect the performance of the low-band patch antenna 130. Similarly, because the low-band excitation via 132 is located at or aligned to the short circuit line 103 of the high-band patch antenna 120, excitations at the low-band excitation via 132 may not affect the performance of the high-band patch antenna 120. Accordingly, the high-band patch antenna 120 and the low-band patch antenna 130 may radiate simultaneously in respective frequency bands without impacting each other's performance.

Example Dual Wideband Antenna Apparatuses

Figure 3:
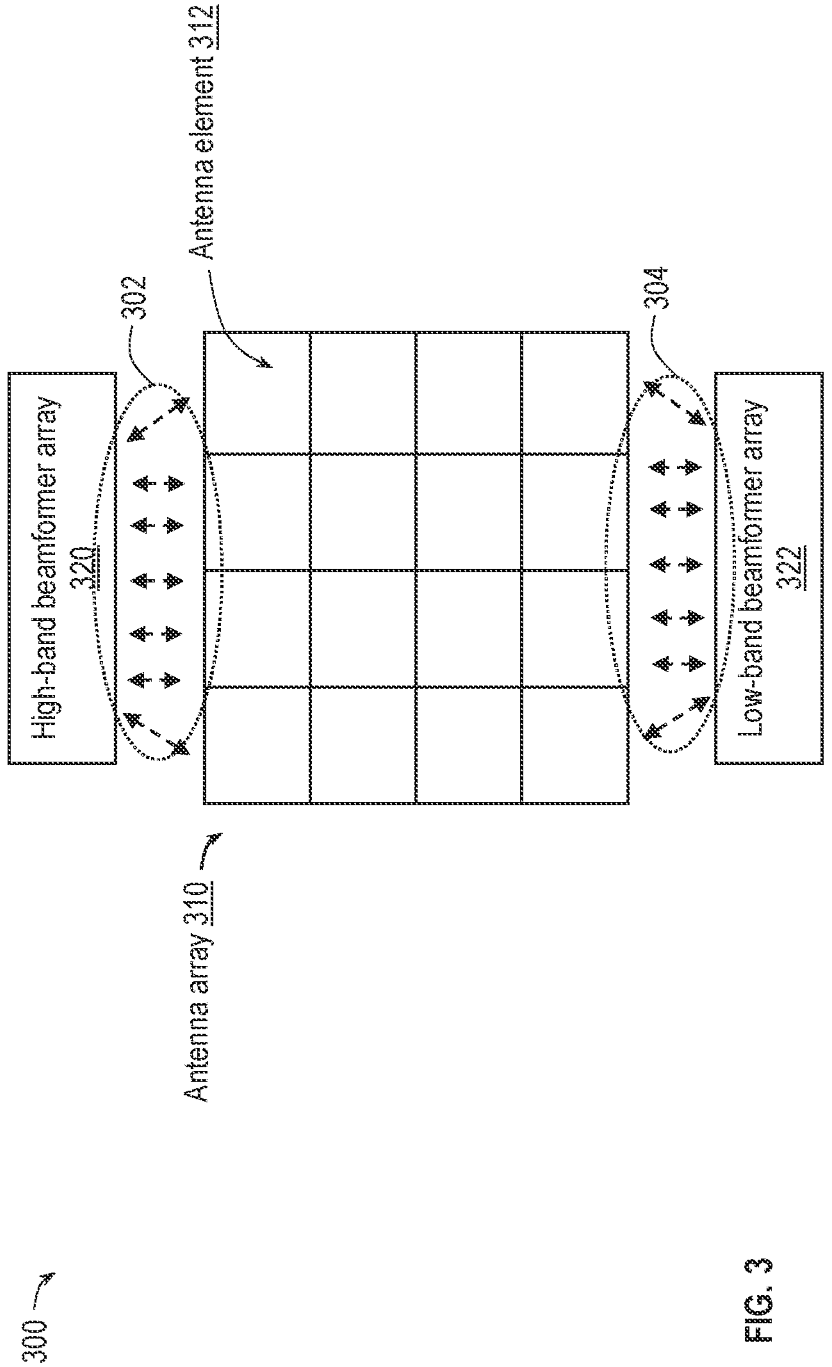
FIG. 3 is a block diagram illustrating an exemplary dual wideband antenna apparatus, according to some embodiments of the disclosure.

FIG. 3 is a block diagram illustrating an exemplary dual wideband antenna apparatus 300, according to some embodiments of the disclosure. The antenna apparatus 300 may be used in an RF system for wireless transmission and/or reception. In some instances, the antenna apparatus 300 may be part of the antenna apparatus 600 of FIG. 6. As shown in FIG. 3, the antenna apparatus 300 may include an antenna array 310, a high-band beamformer array 320, and a low-band beamformer array 322.

The antenna array 310 may include a plurality of antenna elements 312 (only one of which is labeled with a reference numeral in FIG. 3 in order to not clutter the drawing). The antenna elements 312 may include any suitable elements configured to wirelessly transmit and/or receive RF signals. In some aspects, the phased array antenna 310 may be a printed phased array antenna. In some aspects, the antenna elements 312 may support dual wideband operations (e.g., at a 39 GHz band and at a 28 GHz band). To that end, the antenna elements 312 may be implemented using two independent stacked patch antennas (e.g., a high-band patch antenna 120 and a low-band patch antenna 130) arranged on a multi-layered structure (e.g., a multi-layer PCB stack-up) as discussed above with reference to FIGS. 1A-1E and 2. In some specific embodiments, the antenna elements 312 may have a structure with dual stripline excitations (e.g., the high-band excitation stripline 252 and the low-band excitation stripline 250) as discussed above with reference to FIG. 2.

Each of the high-band beamformer array 320 and the low-band beamformer array 322 may be configured to perform beamforming. Beamforming is a technique by which an array of antennas (e.g., the antenna elements 312) can be steered to transmit radio signals or receive radio signals in a specific spatial direction. Beamforming may include adjusting the phases of signals transmitted by the antenna elements 312 in the array 310 so that the transmitted signals may provide constructive interference in the desired spatial direction and destructive interference in other spatial directions.

In some aspects, the high-band beamformer array 320 may be an integrated circuit (IC) including phase shifters and/or amplifiers configured to vary the phases and/or amplitudes of a signal (e.g., a 39 GHz signal) to produce a set of phase-shifted and/or gain-adjusted signals for beamforming. The high-band beamformer array 320 may provide a plurality of beamformer channels. A beamformer channel may include phase-shifters, amplifiers, transmit/receive switches, and/or input/output ports (e.g., similar to the beamformers 622 shown in FIG. 6). Each beamformer channel may perform beamforming operations independent from each other. Each beamform channel may generate one of the phase-shifted and/or gain-adjusted signals in the set. For transmission, the plurality of beamformer channels may be coupled to at least a subset of the antenna elements 312 to feed the set of phase-shifted and/or gain-adjusted signals to the subset of the antenna elements 312. More specifically, each beamformer channel may feed a different one of the phase-shifted and/or gain-adjusted signals to a different antenna element 312 in the subset. That is, each antenna element 312 in the subset may transmit the same signal but with different phases and/or gains. A signal radiated or emitted by the antenna array 310 may have a radiation pattern with a main beam (e.g., directing to a particular direction) generated based on constructive interference of RF signals emitted by the subset of the antenna elements 312.

In some aspects, the high-band beamformer array 320 may include a plurality of input/output ports, and each beamformer channel may have an associated port for interfacing (e.g., receiving from and/or transmitting to) with the channel. As mentioned above, each antenna element 312 may have a high-band excitation stripline and a low-band excitation stripline. Accordingly, each antenna element 312 may be coupled to at least one of the beamformer channels (or channel ports) of the high-band beamformer array 320 by a corresponding high-band excitation stripline of the antenna element 312 so that a signal in a high-frequency band (e.g., a 39 GHz band) may be fed to and/or from the antenna element 312 for beamforming as shown by the arrows 302. For instance, the subset of antenna elements 312 may together transmit a beamformed signal in the low-frequency band (e.g., a 39 GHz band) that is focused or directed to a certain direction.

In a similar way, the low-band beamformer array 322 may be an IC including phase shifters and/or amplifiers configured to vary the phases and/or amplitudes of a signal (e.g., a 28 GHz signal) to generate a set of phase-shifted and/or gain-adjusted signals for beamforming. The low-band beamformer array 322 may provide a plurality of beamformer channels, where each beamform channel may generate one of the phase-shifted and/or gain-adjusted signals in the set. The plurality of beamformer channels may be coupled to at least a subset of the antenna elements 312 to feed the set of phase-shifted and/or gain-adjusted signals to the subset of the antenna elements 312. More specifically, each beamformer channel may feed a different one of the phase-shifted and/or gain-adjusted signals to a different antenna element 312 in the subset. In some aspects, the low-band beamformer array 322 may include a plurality of input/output ports, and each beamformer channel may have an associated port for interfacing (e.g., receiving from and/or transmitting to) with the channel. Each antenna element 312 may be coupled to at least one of the beamformer channels (or channel ports) of the low-band beamformer array 322 by a corresponding low-band excitation stripline of the antenna element 312 so that a signal in a low-frequency band (e.g., a 28 GHz band) may be fed to and/or from the antenna element 312 for beamforming as shown by the arrows 304. For instance, the subset of antenna elements 312 may together transmit a beamformed signal in the low-frequency band (e.g., a 28 GHz band) that is focused or directed to a certain direction.

Figure 4:
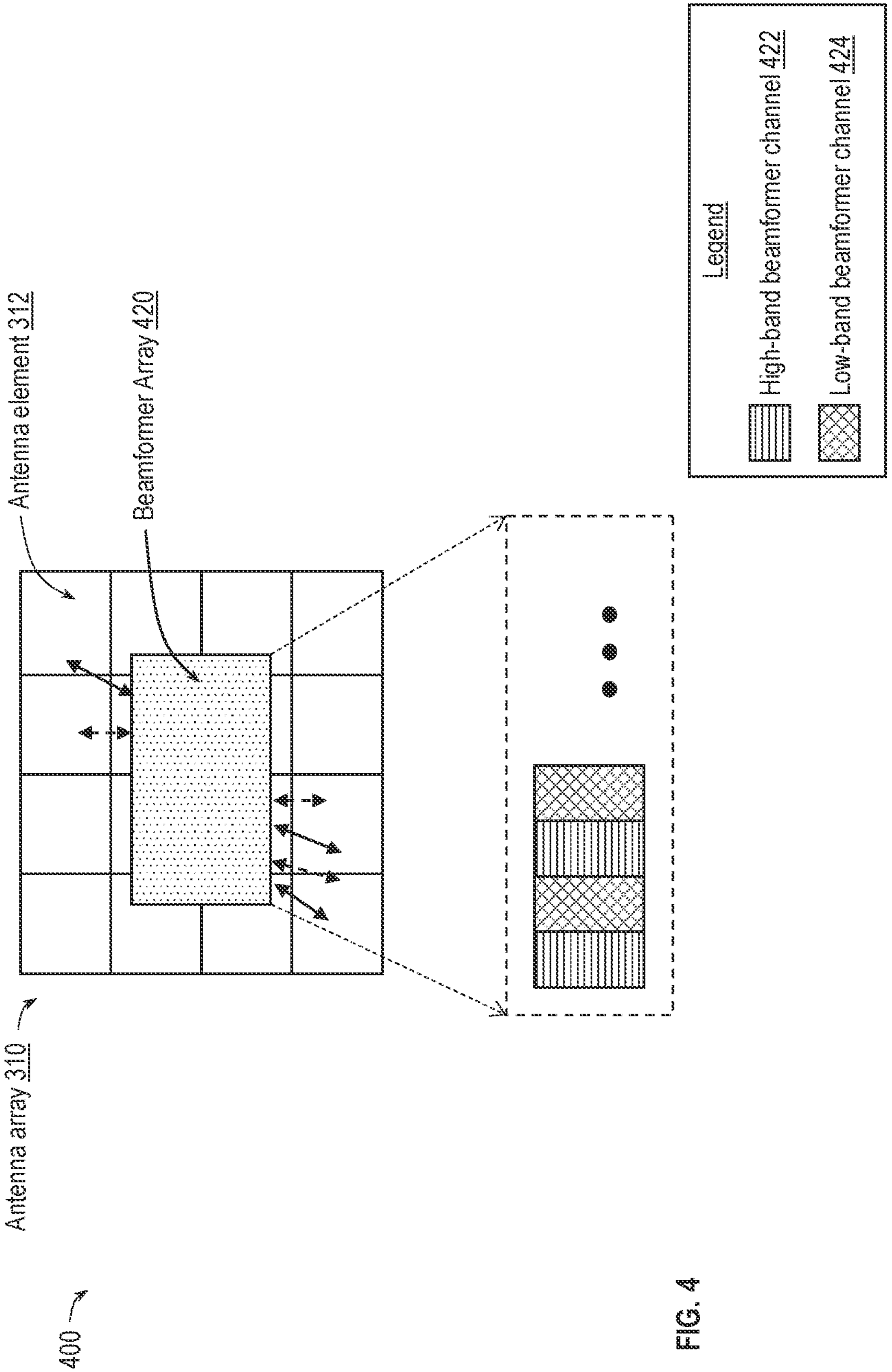
FIG. 4 is a block diagram illustrating an exemplary dual wideband antenna apparatus, according to some embodiments of the disclosure.

FIG. 4 is a block diagram illustrating an exemplary dual wideband antenna apparatus 400, according to some embodiments of the disclosure. The antenna apparatus 400 may be used in an RF system for wireless transmission and/or reception. In some instances, the antenna apparatus 400 may be part of the antenna apparatus 600 of FIG. 6. The antenna apparatus 400 may be substantially similar to the antenna apparatus 400 but may include a single beamformer for both a high-frequency band and a low-frequency band instead of having separate high-band beamformer and low-band beamformer as in the apparatus 300.

As shown in FIG. 4, the antenna apparatus 400 may include an antenna array 310 and a beamformer array 420. The antenna array 310 may include an array of antenna elements 312, for example, each having a structure with two independent stacked patch antennas (e.g., a high-band patch antenna 120 and a low-band patch antenna 130) as discussed above with reference to FIGS. 1A-1E and 2. In some specific embodiments, the antenna elements 312 may have a structure with dual stripline excitations (e.g., the high-band excitation stripline 252 and the low-band excitation stripline 250) as discussed above with reference to FIG. 2.

The beamformer array 420 may be in the form of a single IC. The beamformer array 420 may be substantially similar to the high-band beamformer array 320 and the low-band beamformer array 322. For instance, the beamformer array 420 may include phase-shifters and/or amplifiers configured to perform beamforming. However, the beamformer array 420 may include a first subset of beamformer channels configured for beamforming signals in a high-frequency band (e.g., a 39 GHz band) and a second subset of beamformer channels that are low-band beamformer channels configured for beamforming signals in a low-frequency band (e.g., a 28 GHz band). The first subset of beamformer channels is referred to as high-band beamformer channels 422, and the second subset of beamformer channels is referred to as low-band beamformer channels 424.

Similar to the high-band beamformer array 320 and low-band beamformer array 322, each of the high-band beamformer channels 422 may include a phase-shifter and/or an amplifier to vary the phase and/or an amplitude of a high-frequency signal for beamforming in a specific spatial direction and each channel 422 may have an associated input/output port for interfacing (e.g., receiving from and/or transmitting to) with the channel 422. In a similar way, each of the low-band beamformer channels 424 may include a phase-shifter and/or an amplifier vary the phase and/or an amplitude a low-frequency signal differently for beamforming in a specific spatial direction and each channel 424 may have an associated input/output port for interfacing (e.g., receiving from and/or transmitting to) with the channel 424.

As further shown in FIG. 4, the high-band beamformer channels 422 and the low-band beamformer channels 424 may be arranged physically in an interleaving manner. Phrased differently, the high-band beamformer channels 422 may be spaced apart from each other by one of the low-band beamformer channels 424. As an example, each high-band beamformer channel 422 or low-band beamformer channel 424 may be a complete channel unit independent of each other (e.g., each including phase-shifters, amplifiers, transmit/receive switches, and/or input/output ports), where the beamformer array 420 may include alternating first channel units corresponding to the high-band beamformer channels 422 and second channel units corresponding to the low-band beamformer channel 424. Each antenna element 312 may be coupled to at least one of the high-band beamformer channels 422 by a respective high-band excitation stripline (e.g., the high-band excitation stripline 252) of the antenna element 312 and at least one of the low-band beamformer channels 424 by a respective low-band excitation stripline (e.g., the low-band excitation stripline 250) of the antenna element 312. The interleaving arrangement of the high-band beamformer channels 422 and the low-band beamformer channels 424 can simplify the interface to the antenna elements 312 as each antenna element 312 may be coupled to one of the high-band beamformer channels 422 and one of the low-band beamformer channels 424.

Figure 5:
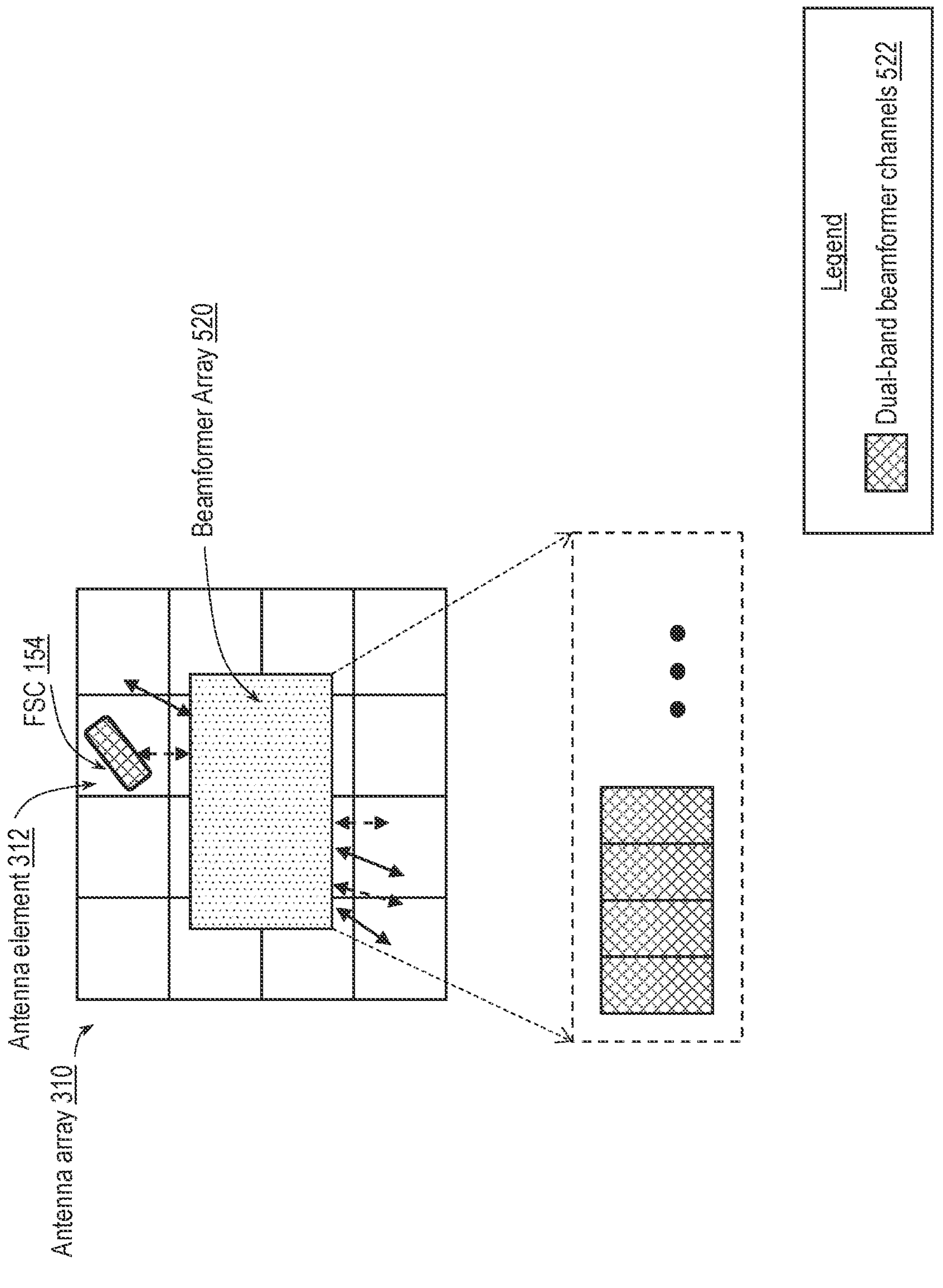
FIG. 5 is a block diagram illustrating an exemplary dual wideband antenna apparatus, according to some embodiments of the disclosure.

FIG. 5 is a block diagram illustrating an exemplary dual wideband antenna apparatus 500, according to some embodiments of the disclosure. The antenna apparatus 500 may be used in an RF system for wireless transmission and/or reception. In some instances, the antenna apparatus 500 may be part of the antenna apparatus 600 of FIG. 6. The antenna apparatus 500 may be substantially similar to the antenna apparatus 400 but may include a beamformer with dual band beamformer channels instead of having separate high-band beamformer channels and low-band beamformer channels as in the apparatus 400.

As shown in FIG. 5, the antenna apparatus 500 may include an antenna array 310 and a beamformer array 520. The antenna array 310 may include an array of antenna elements 312, for example, each having a structure with two independent stacked patch antennas (e.g., a high-band patch antenna 120 and a low-band patch antenna 130) as discussed above with reference to FIGS. 1A-1E and 2. In some specific embodiments, the antenna elements 312 may have a structure with a single stripline excitation (e.g., the excitation stripline 152) for both a high-frequency band (e.g., a 39 GHz band) and a low-frequency band (e.g., a 28 GHz band) and may include a FSC element (e.g., the FSC element 154) as discussed above with reference to FIG. 1B.

In some aspects, the beamformer array 520 may be in the form of a single IC. The beamformer array 520 may be substantially similar to the beamformer arrays 320, 322, and/or 420. However, the beamformer array 520 may include a plurality of dual band beamformer channels 522. Each of the dual band beamformer channels 522 may include a set of phase-shifter and/or an amplifier for beamforming a high-frequency signal in a specific spatial direction and another set of phase-shifter and/or an amplifier for beamforming a low-frequency signal in a specific spatial direction. Further, each dual band beamformer channel 522 may have an associated input/output port for interfacing (e.g., receiving from and/or transmitting to) with the channel 522. Accordingly, each antenna element 312 may be coupled to at least one of the dual band beamformer channels 522 by a common excitation stripline (e.g., the excitation stripline 152) and a FSC element 154 of the antenna element 312. More specifically, each dual band beamformer channel 522 may feed a low-frequency signal in the low-frequency band and/or a high-frequency signal in the high-frequency band to the associated antenna element 312. The low-frequency signal may be delivered to a low-band excitation via (e.g., the low-band excitation via 132) of the antenna element, and the FSC element 154 of the antenna element 312 may pass or couple the high-frequency signal to a high-band excitation via (e.g., the high-band excitation via 122) of the antenna element 312.

Figure 6:
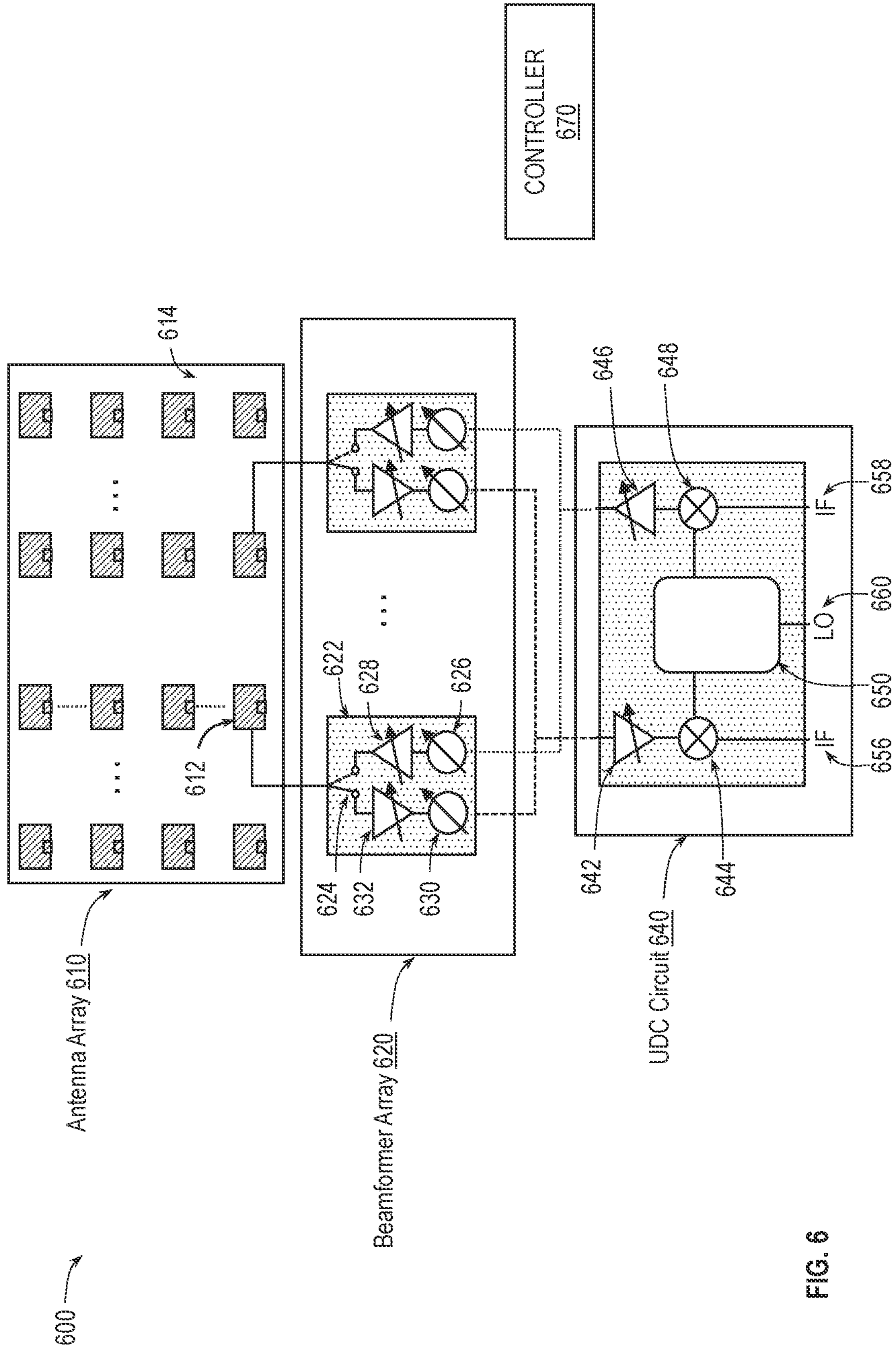
FIG. 6 is a block diagram illustrating an antenna apparatus, according to some embodiments of the disclosure.

FIG. 6 is a schematic diagram of an exemplary antenna apparatus 600, e.g., a phased array system/apparatus, in which compact, wideband antenna elements are utilized to provide a wide scan range, according to some embodiments of the present disclosure. As shown in FIG. 6, the antenna apparatus 600 may include an antenna array 610, a beamformer array 620, a UDC circuit 640, and a controller 670.

In general, the antenna array 610 may include a plurality of antenna elements 612 (only one of which is labeled with a reference numeral in FIG. 6 in order to not clutter the drawing), housed in (e.g., in or over) a substrate 614, where the substrate 614 may be, e.g., a PCB or any other support structure. In various embodiments, the antenna elements 612 may be radiating elements or passive elements. For example, the antenna elements 612 may include dipoles, open-ended waveguides, slotted waveguides, microstrip antennas, and the like. In some embodiments, the antenna elements 612 may include any suitable elements configured to wirelessly transmit and/or receive RF signals. The antenna array 610 may be a phased array antenna and, therefore, will be referred to as such in the following. In some embodiments, the phased array antenna 610 may be a printed phased array antenna. In some embodiments, the antenna array 610 may be similar to the antenna array 310 of FIGS. 3-5.

At least some of the antenna elements 612 may be implemented using two independent stacked patch antennas (e.g., a high-band patch antenna 120 and a low-band patch antenna 130) arranged on a multi-layered structure (e.g., a multi-layer PCB stack-up) with a single stripline excitation or dual stripline excitations as discussed herein, and configured to have provide dual wideband operations. Further details shown in FIG. 6, such as the particular arrangement of the beamformer array 620, of the UDC circuit 640, and the relation between the beamformer array 620 and the UDC circuit 640 may be different in different embodiments, with the description of FIG. 6 providing only some examples of how these components may be used together with the phased array antenna 610 including antenna elements 612 configured, for example, using the antenna structures 100 and/or 200. Furthermore, although some embodiments shown in the present drawings illustrate a certain number of components (e.g., a certain number of antenna elements 612, beamformers, and/or UDC circuits), it is appreciated that these embodiments may be implemented with any number of these components in accordance with the descriptions provided herein. Furthermore, although the disclosure may discuss certain embodiments with reference to certain types of components of an antenna apparatus (e.g., referring to a substrate that houses antenna element as a PCB although in general it may be any suitable support structure), it is understood that the embodiments disclosed herein may be implemented with different types of components.

The beamformer array 620 may include a plurality of beamformers 622 (only one of which is labeled with a reference numeral in FIG. 6 in order to not clutter the drawing). The beamformers 622 may be seen as transceivers (e.g., devices which may transmit and/or receive signals, in this case—RF signals) that feed to antenna elements 612. In some embodiments, a single beamformer 622 may be associated with (i.e., exchange signals with, e.g., feed signals to) one of the antenna elements 612 (e.g., in a one-to-one correspondence). In other embodiments, multiple beamformers 622 may be associated with a single antenna element 612. Yet in other embodiments, a single beamformer 622 may be associated with a plurality of antenna elements 612. In some embodiments, when a given antenna element 612 is implemented with the antenna structure 100 or 200 as discussed herein (e.g., two independent stacked patch antennas (e.g., a high-band patch antenna 120 and a low-band patch antenna 130) arranged on a multi-layered structure (e.g., a multi-layer PCB stack-up)), a dual band beamformer 622 may be configured to support signals for dual band beamforming. In general, one or more beamformers 622 may be connected to each antenna element 612 to support beamforming for signals in a high-frequency band (e.g., with one of a vertical polarization or a horizontal polarization) and in a low-frequency band (e.g., with the other one of the vertical polarization or the horizontal polarization). In some embodiments, the beamformers 622 may correspond to the beamformer channels in the beamformer arrays 320 and 322, the beamformer channels 422 and 424 in the beamformer array 420, and/or beamformer channels 522 in the beamformer array 520 discussed above.

In some embodiments, each of the beamformers 622 may include a switch 624 to switch the path from the corresponding antenna element 612 to the receiver or the transmitter path. Although not specifically shown in FIG. 6, in some embodiments, each of the beamformers 622 may also include another switch to switch the path from a signal processor (also not shown) to the receiver or the transmitter path. As shown in FIG. 6, in some embodiments, the transmit path (TX path) of each of the beamformers 622 may include a phase shifter 626 and a variable (e.g., programmable) gain amplifier 628, while the receive path (RX path) may include a phase shifter 630 and a variable (e.g., programmable) gain amplifier 632. The phase shifter 626 may be configured to adjust the phase of the RF signal to be transmitted (TX signal) by the antenna element 612 and the variable gain amplifier 628 may be configured to adjust the amplitude of the TX signal to be transmitted by the antenna element 612. Similarly, the phase shifter 630 and the variable gain amplifier 632 may be configured to adjust the RF signal received (RX signal) by the antenna element 612 before providing the RX signal to further circuitry, e.g., to the UDC circuit 640, to the signal processor (not shown), etc. The beamformers 622 may be considered to be "in the RF path" of the antenna apparatus 600 because the signals traversing the beamformers 622 are RF signals (i.e., TX signals which may traverse the beamformers 622 are RF signals upconverted by the UDC circuit 640 from lower frequency signals, e.g., from intermediate frequency (IF) signals or from baseband signals, while RX signals which may traverse the beamformers 622 are RF signals which have not yet been downconverted by the UDC circuit 640 to lower frequency signals, e.g., to IF signals or to baseband signals).

Although a switch is shown in FIG. 6 to switch from the transmitter path to the receive path (i.e., the switch 624), in other embodiments of the beamformer 622, other components can be used, such as a duplexer. Furthermore, although FIG. 6 illustrates an embodiment where the beamformers 622 include the phase shifters 626, 630 (which may also be referred to as "phase adjusters") and the variable gain amplifiers 628, 632, in other embodiments, any of the beamformers 622 may include other components to adjust the magnitude and/or the phase of the TX and/or RX signals. In some embodiments, one or more of the beamformers 622 may not include the phase shifter 626 and/or the phase shifter 630 because the desired phase adjustment may, alternatively, be performed using a phase shift module in the local oscillator (LO) path. In other embodiments, phase adjustment performed in the LO path may be combined with phase adjustment performed in the RF path using the phase shifters of the beamformers 622.

Turning to the details of the UDC, in general, the UDC circuit 640 may include an upconverter and/or downconverter circuitry, i.e., in various embodiments, the UDC circuit 640 may include 6) an upconverter circuit but no downconverter circuit, 2) a downconverter circuit but no upconverter circuit, or 3) both an upconverter circuit and a downconverter circuit. As shown in FIG. 6, in some embodiments, the downconverter circuit of the UDC circuit 640 may include an amplifier 642 and a mixer 644, while the upconverter circuit of the UDC circuit 640 may include an amplifier 646 and a mixer 648. In some embodiments, the UDC circuit 640 may further include a phase shift module 650.

In various embodiments, the term "UDC circuit" may be used to include frequency conversion circuitry (e.g., a frequency mixer configured to perform upconversion to RF signals for wireless transmission, a frequency mixer configured to perform downconversion of received RF signals, or both), as well as any other components that may be included in a broader meaning of this term, such as filters, analog-to-digital converters (ADCs), digital-to-analog converters (DACs), transformers, and other circuit elements typically used in association with frequency mixers. In all of these variations, the term "UDC circuit" covers implementations where the UDC circuit 640 only includes circuit elements related to the TX path (e.g., only an upconversion mixer but not a downconversion mixer; in such implementations the UDC circuit may be used as/in an RF transmitter for generating RF signals for transmission), implementations where the UDC circuit 640 only includes circuit elements related to the RX path (e.g., only an downconversion mixer but not an upconversion mixer; in such implementations the UDC circuit 640 may be used as/in an RF receiver to downconvert received RF signals, e.g., the UDC circuit 640 may enable an antenna element of the phased array antenna 610 to act, or be used, as a receiver), as well as implementations where the UDC circuit 640 includes, both, circuit elements of the TX path and circuit elements of the RX path (e.g., both the upconversion mixer and the downconversion mixer; in such implementations the UDC circuit 640 may be used as/in an RF transceiver, e.g., the UDC circuit 640 may enable an antenna element of the phased array antenna 610 to act, or be used, as a transceiver).

Although a single UDC circuit 640 is illustrated in FIG. 6, multiple UDC circuits 640 may be included in the antenna apparatus 600 to provide upconverted RF signals to and/or receive RF signals to be downconverted from any one of the beamformers 622. Each UDC circuit 640 may be associated with a plurality of beamformers 622 of the beamformer array 620, e.g., using a splitter/combiner. This is schematically illustrated in FIG. 6 with dashed lines and dotted lines within the splitter/combiner connecting various elements of the beamformer array 620 and the UDC circuit 640. Namely, FIG. 6 illustrates that the dashed lines connect the downconverter circuit of the UDC circuit 640 (namely, the amplifier 642) to the RX paths of two different beamformers 622, and that the dotted lines connect the upconverter circuit of the UDC circuit 640 (namely, the amplifier 646) to the TX paths of two different beamformers 622. For example, there may be 96 beamformers 622 in the beamformer array 620, associated with 96 antenna elements 612 of the phased array antenna 610.

In some embodiments, the mixer 644 in the downconverter path (i.e., RX path) of the UDC circuit 640 may have at least two inputs and one output. One of the inputs of the mixer 644 may include an input from the amplifier 642, which may, e.g., be a low-noise amplifier (LNA). The second input of the mixer 644 may include an input indicative of the LO signal 660. In some embodiments, phase shifting may be implemented in the LO path (additionally or alternatively to the phase shifting in the RF path), in which case the LO signal 660 may be provided, first, to a phase shift module 650, and then a phase-shifted LO signal 660 is provided as the second input to the mixer 644. In the embodiments where phase shifting in the LO path is not implemented, the phase shift module 650 may be absent and the second input of the mixer 644 may be configured to receive the LO signal 660. The one output of the mixer 644 is an output to provide the downconverted signal 656, which may, e.g., be an IF signal 656. The mixer 644 may be configured to receive an RF RX signal from the RX path of one of the beamformers 622, after it has been amplified by the amplifier 642, at its first input and receive either a signal from the phase shift module 650 or the LO signal 660 itself at its second input, and mix these two signals to downconvert the RF RX signal to an lower frequency, producing the downconverted RX signal 656, e.g., the RX signal at the IF. Thus, the mixer 644 in the downconverter path of the UDC circuit 640 may be referred to as a "downconverting mixer."

In some embodiments, the mixer 648 in the upconverter path (i.e., TX path) of the UDC circuit 640 may have [at least] two inputs and one output. The first input of the mixer 648 may be an input for receiving a TX signal 658 of a lower frequency, e.g., the TX signal at IF. The second input of the mixer 648 may include an input indicative of the LO signal 660. In the embodiments where phase shifting is implemented in the LO path (either additionally or alternatively to the phase shifting in the RF path), the LO signal 660 may be provided, first, to a phase shift module 650, and then a phase-shifted LO signal 660 is provided as the second input to the mixer 648. In the embodiments where phase shifting in the LO path is not implemented, the phase shift module 650 may be absent and the second input of the mixer 648 may be configured to receive the LO signal 660. The one output of the mixer 648 is an output to the amplifier 646, which may, e.g., be a power amplifier (PA). The mixer 648 may be configured to receive an IF TX signal 658 (i.e., the lower frequency, e.g. IF, signal to be transmitted) at its first input and receive either a signal from the phase shift module 650 or the LO signal 660 itself at its second input, and mix these two signals to upconvert the IF TX signal to the desired RF frequency, producing the upconverted RF TX signal to be provided, after it has been amplified by the amplifier 646, to the TX path of one of the beamformers 622. Thus, the mixer 648 in the upconverter path of the UDC circuit 640 may be referred to as a "upconverting mixer."

In some embodiments, the amplifier 628 may be a PA and/or the amplifier 632 may be an LNA.

As is known in communications and electronic engineering, an IF is a frequency to which a carrier wave is shifted as an intermediate step in transmission or reception. The IF signal may be created by mixing the carrier signal with an LO signal in a process called heterodyning, resulting in a signal at the difference or beat frequency. Conversion to IF may be useful for several reasons. One reason is that, when several stages of filters are used, they can all be set to a fixed frequency, which makes them easier to build and to tune. Another reason is that lower frequency transistors generally have higher gains so fewer stages may be required. Yet another reason is to improve frequency selectivity because it may be easier to make sharply selective filters at lower fixed frequencies. It should also be noted that, while some descriptions provided herein refer to signals 656 and 658 as IF signals, these descriptions are equally applicable to embodiments where signals 656 and 658 are baseband signals. In such embodiments, frequency mixing of the mixers 644 and 648 may be a zero-IF mixing (also referred to as a "zero-IF conversion") in which the LO signal 660 used to perform the mixing may have a center frequency in the band of RF RX/TX frequencies.

Although not specifically shown in FIG. 6, in further embodiments, the UDC circuit 640 may further include a balancer, e.g., in each of the TX and RX paths, configured to mitigate imbalances in the in-phase and quadrature (IQ) signals due to mismatching. Furthermore, although also not specifically shown in FIG. 6, in other embodiments, the antenna apparatus 600 may include further instances of a combination of the phased array antenna 610, the beamformer array 620, and the UDC circuit 640 as described herein.

The controller 670 may include any suitable device, configured to control operation of various parts of the antenna apparatus 600. For example, in some embodiments, the controller 670 may control the amount and the timing of phase shifting implemented in the antenna apparatus 600. In another example, in some embodiments, the controller 670 may control various signals, as well as the timing of those signals, provided to the antenna elements 612 implemented using the antenna structures 100 and/or 200 in the antenna array 610 to provide dual band operations and/or a wide scan range.

The antenna apparatus 600 can steer an electromagnetic radiation pattern of the phased array antenna 610 in a particular direction, thereby enabling the phased array antenna 610 to generate a main beam in that direction and side lobes in other directions. The main beam of the radiation pattern is generated based on constructive inference of the transmitted RF signals based on the transmitted signals' phases. The side lobe levels may be determined by the amplitudes of the RF signals transmitted by the antenna elements. The antenna apparatus 600 can generate desired antenna patterns by providing phase shifter settings for the antenna elements 612, e.g., using the phase shifters of the beamformers 622 and/or the phase shift module 650.

EXAMPLES

Example 1 includes a dual band antenna structure, including a first patch antenna disposed on a first layer of the structure; a second patch antenna disposed on a second layer of the structure, where the second layer is vertically below the first layer and spaced apart by a dielectric substrate, and where the second patch antenna has a larger size than the first patch antenna and at least partially overlaps with the first patch antenna; a first excitation conductor electrically coupled to the first patch antenna; and a second excitation conductor electrically coupled to the second patch antenna, where the second excitation conductor is separate from the first excitation conductor. Example 2 includes the dual band antenna structure of Example 1, where the first patch antenna has a first resonant frequency within a first frequency band, and where the second patch antenna has a second resonant frequency within a second frequency band separate from the first frequency band.

Example 3 includes the dual band antenna structure of any of Examples 1-2, where a ratio between the first resonant frequency of the first patch antenna and the second resonant frequency of the second patch antenna is greater than 1 and less than 2.

Example 4 includes the dual band antenna structure of any of Examples 1-3, where the first patch antenna is associated with a first polarization, and where the second patch antenna is associated with a second polarization different from the first polarization.

Example 5 includes the dual band antenna structure of any of Examples 1-4, further includes a third excitation conductor disposed on a third layer of the structure, where the third layer is vertically below the second layer, where the first excitation conductor has a first end coupled to the first patch antenna and a second end coupled to the third excitation conductor.

Example 6 includes the dual band antenna structure of any of Examples 1-5, where the first excitation conductor extends vertically from the third layer to the first layer through the second patch antenna.

Example 7 includes the dual band antenna structure of any of Examples 1-6, where the first excitation conductor extends vertically from the third layer to the first layer through a short circuit line of the second patch antenna.

Example 8 includes the dual band antenna structure of any of Examples 1-7, further includes a fourth excitation conductor disposed on the third layer, where the fourth excitation conductor is separate from the third excitation conductor, where the second excitation conductor has a first end coupled to the second patch antenna and a second end coupled to the fourth excitation conductor.

Example 9 includes the dual band antenna structure of any of Examples 1-7, further includes a frequency selective coupling element disposed on the third layer of the structure and coupled between the first excitation conductor and the third excitation conductor.

Example 10 includes the dual band antenna structure of any of Examples 1-9, further includes a first ground layer vertically below the second layer; and a second ground layer vertically below the first ground layer, where the third layer in which the third excitation conductor is disposed is between the first ground layer and the second ground layer.

Example 11 includes the dual band antenna structure of any of Examples 1-10, where the first layer, the second layer, the third layer, the first ground layer, and the second ground layer are spaced apart from each other by dielectric material.

Example 12 includes a dual band antenna structure, including a high-band patch antenna to wirelessly communicate a first signal in a first frequency band; a low-band patch antenna to wirelessly communicate a second signal in a second frequency band lower than the first frequency band, where the low-band patch antenna is stacked vertically below the high-band patch antenna and spaced apart from the high-band patch antenna by a dielectric substrate; a high-band excitation via electrically coupled to the high-band patch antenna; and a low-band excitation via electrically coupled to the low-band patch antenna, where the high-band excitation via is separate from the low-band excitation via.

Example 13 includes the dual band antenna structure of Example 12, where the high-band patch antenna further communicates the first signal in one of a horizontal polarization or a vertical polarization, and where the low-band patch antenna further communicates the second signal in the other one of the horizontal polarization or the vertical polarization.

Example 14 includes the dual band antenna structure of any of Examples 12-13, further includes a first excitation stripline coupled to at least one of the high-band excitation via or the low-band excitation via.

Example 15 includes the dual band antenna structure of any of Examples 12-14, where the first excitation stripline is coupled to the high-band excitation via; and the dual band antenna structure further includes a second excitation stripline coupled to the low-band excitation via, where the second excitation stripline is separate from the first excitation stripline.

Example 16 includes the dual band antenna structure of any of Examples 12-14, where the first excitation stripline is coupled to the high-band excitation via and the low-band excitation via; and the dual band antenna structure further includes a frequency selective coupling element having a first terminal connected to the high-band excitation via and a second terminal connected to the low-band excitation via.

Example 17 includes the dual band antenna structure of any of Examples 12-16, where at least one of the high-band patch antenna has a conductive plane with a U-shaped opening; or the low-band patch antenna has a conductive plane with a U-shaped opening.

Example 18 includes a dual band antenna array apparatus, including a plurality of dual band antenna elements, where a first dual band antenna element of the plurality of dual band antenna elements includes a high-band patch antenna to wirelessly communicate a first signal in a first frequency band; a low-band patch antenna to wirelessly communicate a second signal in a second frequency band lower than the first frequency band, where the low-band patch antenna is stacked below the high-band patch antenna and spaced apart from the high-band patch antenna by a dielectric substrate; a high-band excitation conductor electrically coupled to the high-band patch antenna; and a low-band excitation conductor electrically coupled to the low-band patch antenna, where the low-band excitation conductor is separate from the high-band excitation conductor; and beamformer circuitry coupled to one or more of the plurality of dual band antenna elements, where the beamformer circuitry includes a plurality of beamformer channels.

Example 19 includes the dual band antenna array apparatus of Example 18, where a first subset of the plurality of beamformer channels are associated with the first frequency band, and where a second subset of the plurality of beamformer channels are associated with the second frequency band.

Example 20 includes the dual band antenna array apparatus of any of Examples 18-19, where the beamformer circuitry includes a first beamformer integrated circuit including the first subset of the plurality of beamformer channels associated with the first frequency band; and a second beamformer integrated circuit including the second subset of the plurality of beamformer channels associated with the second frequency band.

Example 21 includes the dual band antenna array apparatus of any of Examples 18-19, further includes a beamformer integrated circuit including the plurality of beamformer channels, where the first subset of the plurality of beamformer channels associated with the first frequency band are spaced apart from each other by the second subset of the plurality of beamformer channels associated with the second frequency band in the beamformer integrated circuit.

Example 22 includes the dual band antenna array apparatus of any of Examples 18-19, where the first dual band antenna element is coupled to a first beamformer channel in the first subset of the plurality of beamformer channels by the high-band excitation conductor; and a second beamformer channel in the second subset of the plurality of beamformer channels by the low-band excitation conductor.

Example 23 includes the dual band antenna array apparatus of Example 18, where the beamformer channels in the beamformer circuitry are dual band beamformer channels; the first dual band antenna element further includes a frequency selective coupling element; and a common excitation conductor coupled to one of the high-band excitation conductor or the low-band excitation conductor directly and coupled to the other one of the high-band excitation conductor or the low-band excitation conductor via the common excitation conductor; and the first dual band antenna element is further coupled to one of the dual band beamformer channels by the common excitation conductor.

Variations and Implementations

While embodiments of the present disclosure were described above with references to exemplary implementations as shown in FIGS. 1A-1E and 2-6, a person skilled in the art will realize that the various teachings described above are applicable to a large variety of other implementations.

In certain contexts, the features discussed herein can be applicable to automotive systems, safety-critical industrial applications, medical systems, scientific instrumentation, wireless and wired communications, radio, radar, industrial process control, audio and video equipment, current sensing, instrumentation (which can be highly precise), and other digital-processing-based systems.

In the discussions of the embodiments above, components of a system, such as filters, frequency selective coupling elements, phase-shifters, vias, and/or other components can readily be replaced, substituted, or otherwise modified in order to accommodate particular circuitry needs. Moreover, it should be noted that the use of complementary electronic devices, hardware, software, etc., offer an equally viable option for implementing the teachings of the present disclosure related to dual wideband antennas, in various communication systems.

In one example embodiment, any number of electrical circuits of the present figures may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of DSPs, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

In another example embodiment, the electrical circuits of the present figures may be implemented as stand-alone modules (e.g., a device with associated components and circuitry configured to perform a specific application or function) or implemented as plug-in modules into application specific hardware of electronic devices. Note that particular embodiments of the present disclosure may be readily included in a system on chip (SOC) package, either in part, or in whole. An SOC represents an IC that integrates components of a computer or other electronic system into a single chip. It may contain digital, analog, mixed-signal, and often RF functions: all of which may be provided on a single chip substrate. Other embodiments may include a multi-chip-module (MCM), with a plurality of separate ICs located within a single electronic package and configured to interact closely with each other through the electronic package.

It is also imperative to note that all of the specifications, dimensions, and relationships outlined herein (e.g., the number of components of the antenna structures and/or antenna apparatuses shown in FIGS. 1A-1E and 2-6) have only been offered for purposes of example and teaching only. Such information may be varied considerably without departing from the spirit of the present disclosure, or the scope of the appended claims. It should be appreciated that the system can be consolidated in any suitable manner. Along similar design alternatives, any of the illustrated circuits, components, modules, and elements of the present figures may be combined in various possible configurations, all of which are clearly within the broad scope of this specification. In the foregoing description, example embodiments have been described with reference to particular processor and/or component arrangements. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Various aspects of the illustrative embodiments are described using terms commonly employed by those skilled in the art to convey the substance of their work to others skilled in the art. For example, the term "connected" means a direct electrical connection between the things that are connected, without any intermediary devices/components, while the term "coupled" means either a direct electrical connection between the things that are connected, or an indirect connection through one or more passive or active intermediary devices/components. In another example, the term "circuit" means one or more passive and/or active components that are arranged to cooperate with one another to provide a desired function. Also, as used herein, the terms "substantially," "approximately," "about," etc., may be used to generally refer to being within +/−20% of a target value, e.g., within +/−10% of a target value, based on the context of a particular value as described herein or as known in the art.

Numerous other changes, substitutions, variations, alterations, and modifications may be ascertained to one skilled in the art and it is intended that the present disclosure encompass all such changes, substitutions, variations, alterations, and modifications as falling within the scope of the examples and appended claims. Note that all optional features of the apparatus described above may also be implemented with respect to the method or process described herein and specifics in the examples may be used anywhere in one or more embodiments.

The invention claimed is:

1. A dual band antenna structure, comprising:

a first patch antenna disposed on a first layer of the dual band antenna structure;

a second patch antenna disposed on a second layer of the dual band antenna structure, wherein the second layer is vertically below the first layer and spaced apart by a dielectric substrate, and wherein the second patch antenna has a larger size than the first patch antenna and at least partially overlaps with the first patch antenna, with the second patch antenna having a conductive plane defining an opening at a side of the conductive plane;

a first excitation conductor electrically coupled to the first patch antenna through the opening; and a second excitation conductor electrically coupled to the second patch antenna, wherein the second excitation conductor is separate from the first excitation conductor.

2. The dual band antenna structure of claim 1, wherein the first patch antenna has a first resonant frequency within a first frequency band, and wherein the second patch antenna has a second resonant frequency within a second frequency band separate from the first frequency band.

3. The dual band antenna structure of claim 2, wherein a ratio between the first resonant frequency of the first patch antenna and the second resonant frequency of the second patch antenna is greater than 1 and less than 2.

4. The dual band antenna structure of claim 1, wherein the first patch antenna is associated with a first polarization, and wherein the second patch antenna is associated with a second polarization different from the first polarization.

5. The dual band antenna structure of claim 1, further comprising:

a third excitation conductor disposed on a third layer of the dual band antenna structure, wherein the third layer is vertically below the second layer, wherein the first excitation conductor has a first end coupled to the first patch antenna and a second end coupled to the third excitation conductor.

6. The dual band antenna structure of claim 5, wherein the first excitation conductor extends vertically from the third layer to the first layer through the second patch antenna.

7. The dual band antenna structure of claim 5, wherein the first excitation conductor extends vertically from the third layer to the first layer through a short circuit line of the second patch antenna.

8. The dual band antenna structure of claim 5, further comprising:

a fourth excitation conductor disposed on the third layer, wherein the fourth excitation conductor is separate from the third excitation conductor, wherein the second excitation conductor has a first end coupled to the second patch antenna and a second end coupled to the fourth excitation conductor.

9. The dual band antenna structure of claim 5, further comprising:

a frequency selective coupling element disposed on the third layer of the dual band antenna structure and coupled between the first excitation conductor and the third excitation conductor.

10. A dual band antenna structure, comprising:

a high-band patch antenna to wirelessly communicate a first signal in a first frequency band;

a low-band patch antenna to wirelessly communicate a second signal in a second frequency band lower than the first frequency band, wherein the low-band patch antenna is stacked vertically below the high-band patch antenna and spaced apart from the high-band patch antenna by a dielectric substrate, with the low-band patch antenna having a conductive plane defining an opening at a side of the conductive plane;

a high-band excitation via electrically coupled to the high-band patch antenna through the opening; and a low-band excitation via electrically coupled to the low-band patch antenna, wherein the high-band excitation via is separate from the low-band excitation via.

11. The dual band antenna structure of claim 10, wherein the high-band patch antenna further communicates the first signal in one of a horizontal polarization or a vertical polarization, and wherein the low-band patch antenna further communicates the second signal in the other one of the horizontal polarization or the vertical polarization.

12. The dual band antenna structure of claim 10, further comprising:

a first excitation stripline coupled to at least one of the high-band excitation via or the low-band excitation via.

13. The dual band antenna structure of claim 12, wherein:

the first excitation stripline is coupled to the high-band excitation via; and the dual band antenna structure further comprises:

a second excitation stripline coupled to the low-band excitation via, wherein the second excitation stripline is separate from the first excitation stripline.

14. The dual band antenna structure of claim 12, wherein:

the first excitation stripline is coupled to the high-band excitation via and the low-band excitation via; and the dual band antenna structure further comprises:

a frequency selective coupling element having a first terminal connected to the high-band excitation via and a second terminal connected to the low-band excitation via.

15. The dual band antenna structure of claim 10, wherein at least one of:

the high-band patch antenna has a conductive plane with a U-shaped opening; or the conductive plane of the low-band patch antenna defines a U-shaped opening.

16. A dual band antenna array apparatus, comprising:

a plurality of dual band antenna elements, wherein a first dual band antenna element of the plurality of dual band antenna elements comprises:

a high-band patch antenna to wirelessly communicate a first signal in a first frequency band;

a low-band patch antenna to wirelessly communicate a second signal in a second frequency band lower than the first frequency band, wherein the low-band patch antenna is stacked below the high-band patch antenna and spaced apart from the high-band patch antenna by a dielectric substrate, with the low-band patch antenna having a conductive plane defining an opening at a side of the conductive plane;

a high-band excitation conductor electrically coupled to the high-band patch antenna through the opening; and a low-band excitation conductor electrically coupled to the low-band patch antenna, wherein the low-band excitation conductor is separate from the high-band excitation conductor; and beamformer circuitry coupled to one or more of the plurality of dual band antenna elements, wherein the beamformer circuitry comprises a plurality of beamformer channels.

17. The dual band antenna array apparatus of claim 16, wherein the beamformer circuitry comprises:

a first beamformer integrated circuit comprising a first subset of the plurality of beamformer channels associated with the first frequency band; and a second beamformer integrated circuit comprising a second subset of the plurality of beamformer channels associated with the second frequency band.

18. The dual band antenna array apparatus of claim 16, further comprising:

a beamformer integrated circuit comprising the plurality of beamformer channels, wherein a first subset of the plurality of beamformer channels associated with the first frequency band are spaced apart from each other by a second subset of the plurality of beamformer channels associated with the second frequency band in the beamformer integrated circuit.

19. The dual band antenna array apparatus of claim 16, wherein:

a first subset of the plurality of beamformer channels are associated with the first frequency band;

a second subset of the plurality of beamformer channels are associated with the second frequency band; and the first dual band antenna element is coupled to:

a first beamformer channel in the first subset of the plurality of beamformer channels by the high-band excitation conductor; and a second beamformer channel in the second subset of the plurality of beamformer channels by the low-band excitation conductor.

20. The dual band antenna array apparatus of claim 16, wherein:

the beamformer channels in the beamformer circuitry are dual band beamformer channels;

the first dual band antenna element further comprises:

a frequency selective coupling element; and a common excitation conductor coupled to one of the high-band excitation conductor or the low-band excitation conductor directly and coupled to the other one of the high-band excitation conductor or the low-band excitation conductor via the common excitation conductor; and the first dual band antenna element is further coupled to one of the dual band beamformer channels by the common excitation conductor.

* * * * *